United States Patent [19]

Schaller et al.

[11] Patent Number: 5,685,632

[45] Date of Patent: Nov. 11, 1997

[54] ELECTRICALLY CONDUCTIVE PLASTIC LIGHT SOURCE

[75] Inventors: David R. Schaller, Janesville; Martin W. Wirt, McFarland, both of Wis.

[73] Assignee: Rayovac Corporation, Madison, Wis.

[21] Appl. No.: 454,842

[22] Filed: May 31, 1995

[51] Int. Cl.[6] ............................................. F21L 7/00
[52] U.S. Cl. ............................ 362/205; 362/202; 362/208
[58] Field of Search .................................. 362/183, 189, 362/200–206, 208, 458, 800, 157, 260

[56] References Cited

U.S. PATENT DOCUMENTS

| | | | |
|---|---|---|---|
| 1,445,193 | 2/1923 | Alschuler | 362/204 |
| 3,662,166 | 5/1972 | Dietz | 362/201 |
| 3,869,671 | 3/1975 | Schroder | 325/118 |
| 4,194,061 | 3/1980 | Land et al. | 429/82 |
| 5,262,728 | 11/1993 | Shershen | 362/204 |
| 5,379,200 | 1/1995 | Echard | 362/183 |

*Primary Examiner*—Alan Cariaso
*Attorney, Agent, or Firm*—Foley & Lardner

[57] ABSTRACT

The disclosed invention relates to light sources such as battery-powered flashlights and lanterns. Tailcap, battery housing, or head assemblies for light sources are formed from electrically conductive plastic. Those assemblies, or the components of such assemblies, form electrically conductive elements in the electrical circuit of, and may impart shape and structural integrity to, the light source.

38 Claims, 18 Drawing Sheets

Electrical Conductivities of Different Materials and Devices

Thermal Conductivities of Different Materials

Electrical and Thermal Conductivity of PAN Injection-Reinforced Carbon Fiber Filled ABS

ELECTRICALLY CONDUCTIVE PLASTIC LIGHT SOURCE

FIELD OF THE INVENTION

This invention relates to light sources such as battery-powered flashlights and lanterns, and to tailcap, battery housing, head, and other assemblies or components of light sources.

BACKGROUND OF THE INVENTION

Flashlights, lanterns, and other light sources typically comprise a battery housing or barrel assembly for containing a power source, a head assembly comprising a light bulb and a reflector, and a power source for providing electrical current to a light emitter such as an incandescent bulb, a fluorescent lamp, or a light emitting diode (LED). Typically, the power source is a DC power source such as a battery or a plurality of batteries, where the batteries are dry cells or wet cells. Alternatively, the power source may be one of the circuits well known in the electrical arts which rectifies input household AC signals to produce an output DC voltage, or may be a DC-to-DC step-down converter which converts input 12 Volt DC voltage to 3 Volt DC voltage suitable for a flashlight or spotlight. The battery housing and head assemblies typically comprise conductive metal or non-conductive plastic.

In many older flashlights the barrel or battery housing assembly comprised metal, and the metal barrel itself formed a portion of an electrical circuit that included a light bulb and at least one battery. In such a circuit, electrical current flowed from the positive terminal of a battery contained in the barrel to a first terminal of a light bulb, through the bulb to a second terminal of the light bulb, through the metallic conductive barrel, and then to the negative terminal of the battery. A switch, typically a mechanical slide switch mechanism, provided a means of completing and breaking the electrical circuit so that when the flashlight was not being used, electrical power was not drawn from the battery. More than one battery could be placed in series in such a circuit to provide more voltage across the light emitter.

Metal is generally an expensive material to use in a flashlight battery housing assembly. Additionally, battery housings can be difficult and expensive to machine, stamp, draw, or extrude, and may weigh considerably more than other less expensive but equally robust housings formed of materials like plastic. Metal housings may also deform readily upon being dropped on hard surfaces from heights exceeding only a few inches. Metal housings often corrode under normal humidity and temperature ambient conditions. Finally, the metal contained in a metal flashlight housing may react with electrolyte leaking from dry cells contained within the housing to form hydrogen gas. Electrolyte can leak from internally overpressurized, damaged, or overheated dry cells.

Modern flashlights generally have electrically non-conductive plastic barrels or electrically conductive metal barrels. In the case of electrically non-conductive plastic battery housings, separate conductive metal strips or conductive wires typically provide a pathway for electrical current to flow between the negative terminal of the battery or batteries and the first terminal of the light bulb. Alternatively, an annular inner metallic electrically conductive tube may be disposed within the non-conductive plastic barrel to provide such an electrical pathway. Thus, in respect of metal battery housings, non-conductive plastic battery housings contain at least one extra element, be it a separate conductive metal strip, a conductive wire, or an inner annular conductive tube.

Numerous prior art patent disclosures have been made suggesting different structures and compositions of flashlights, and different electrically conductive plastics and polymers, including the following, all of which are hereby incorporated by reference in their respective entireties:

| Country | U.S. Pat. No. | Inventor | Issue Date |
|---|---|---|---|
| U.S.A. | 1,219,109 | Kaplan | 1915 |
| U.S.A. | 1,839,971 | Korsen | 1932 |
| U.S.A. | 2,864,774 | Robinson | 1953 |
| U.S.A. | 3,806,724 | Tanner et al. | 1974 |
| U.S.A. | 3,902,058 | Naylor et al. | 1975 |
| U.S.A. | 4,317,265 | Chase et al. | 1982 |
| U.S.A. | 4,393,284 | Rivolte et al. | 1983 |
| U.S.A. | 4,495,551 | Foltz | 1985 |
| U.S.A. | 4,885,668 | Maglica et al. | 1989 |
| U.S.A. | 5,122,938 | Pastusek | 1992 |
| U.S.A. | 5,219,492 | Osterholm et al. | 1993 |
| U.S.A. | 5,300,374 | Agrawal et al. | 1994 |

SUMMARY OF THE INVENTION

The invention has certain objects. That is, this invention provides solutions to problems existing in the prior art. For example, the invention provides a light source that, in respect of prior art light sources: (a) reduces material costs; (b) reduces the number of structural and electrical components; (c) reduces the number of manufacturing steps; (d) reduces the amount of manufacturing labor; (d) eliminates most or all machining and milling; (e) can be formed into virtually any shape; (f) has increased reliability and physical robustness; (g) does not corrode or oxidize; (h) does not react with electrolyte emitted by internally overpressurized, damaged, or overheated dry cells; (i) does not dent or fracture when dropped; and (j) exhibits higher thermal conductivity than conventional electrically non-conductive plastic flashlights.

In its most basic embodiment, the invention is a light source having an electrical circuit for selectively energizing and de-energizing the light emitter contained therein, wherein an electrically conductive plastic component or assembly serves as a conductive element of the electrical circuit, and may optionally impart structural integrity or shape to the light source.

As a first example of the invention, the tailcap assembly, the battery housing assembly, the head assembly, discrete components of the foregoing assemblies, or any combination of such assemblies or components, may comprise electrically conductive plastic and serve as conductive elements in the electrical circuit of the light source. Those assemblies or components may also impart shape and structural integrity to the light source.

As a second example of the invention, the light source includes a power source housing assembly that contains at least one electrical power source, where the power source is typically a dry cell or a plurality of dry cells. Optionally, the power source housing assembly may contain at least one wet cell, a DC-to-DC step-down converter, or a circuit which rectifies input AC signals to produce an output DC voltage. A light emitter assembly comprising at least one light emitter (such as an LED, an incandescent bulb, or fluorescent lamp) is electrically connected to the power source housing assembly. The light emitter assembly and power source housing assembly define an electrically conductive pathway that permits electrical current from the power source to flow through the assemblies and the light emitter. The light emitter is energized by the electrical current, and provides light in response thereto. A switch assembly is disposed on one of the assemblies, and selectively provides electrical current to the light emitter. At least a portion of the conductive pathway comprises electrically conductive plastic.

In any embodiment of the invention, the electrically conductive assemblies, components, or pathways may comprise intrinsically conductive plastic, extrinsically conductive plastic, or some combination or mixture of both.

Features of the invention include a light source having one or more of the following assemblies or components comprising electrically conductive plastic: (a) a tailcap assembly, or a component of a tailcap assembly; (b) a barrel, or a battery or power source housing assembly, or a component of a barrel, or of a battery or power source housing assembly; (c) a head assembly, or a component of a head assembly; (d) a battery or power source housing extension, or a component of a battery or power source housing extension; and (e) a switch, or a component of a switch. Each of the foregoing assemblies or components may function as a conductive element in an electrical circuit of a light source.

The light source of the invention has certain advantages, including: (a) its structural and electrical simplicity; (b) the small number of modifications required to a conventional light source manufacturing process to make the invention; (c) the elimination of metallic electrical conductors within a light source barrel or battery housing; (d) its quick modification by a user so that the battery housing accepts more or fewer batteries; (e) its structural robustness; (g) its high resistance to oxidation and corrosion; (f) its high thermal conductivity, which is comparable or superior to that of metal flashlights; (g) the electrical anisotropy of the electrically conductive plastic used in some embodiments of the invention; (h) its light weight; (i) its few parts; (j) its non-reactance with electrolyte emitted from dry cells, and (k) the ease with which it may be manufactured. Other objects, features, and advantages of the invention will become apparent from the detailed description of the invention.

BRIEF DESCRIPTION OF THE DRAWINGS

The accompanying drawings describe the details of the invention, where.

DETAILED DESCRIPTION OF THE INVENTION

Throughout the drawings, like numbers refer to like parts.

Figure 1A:
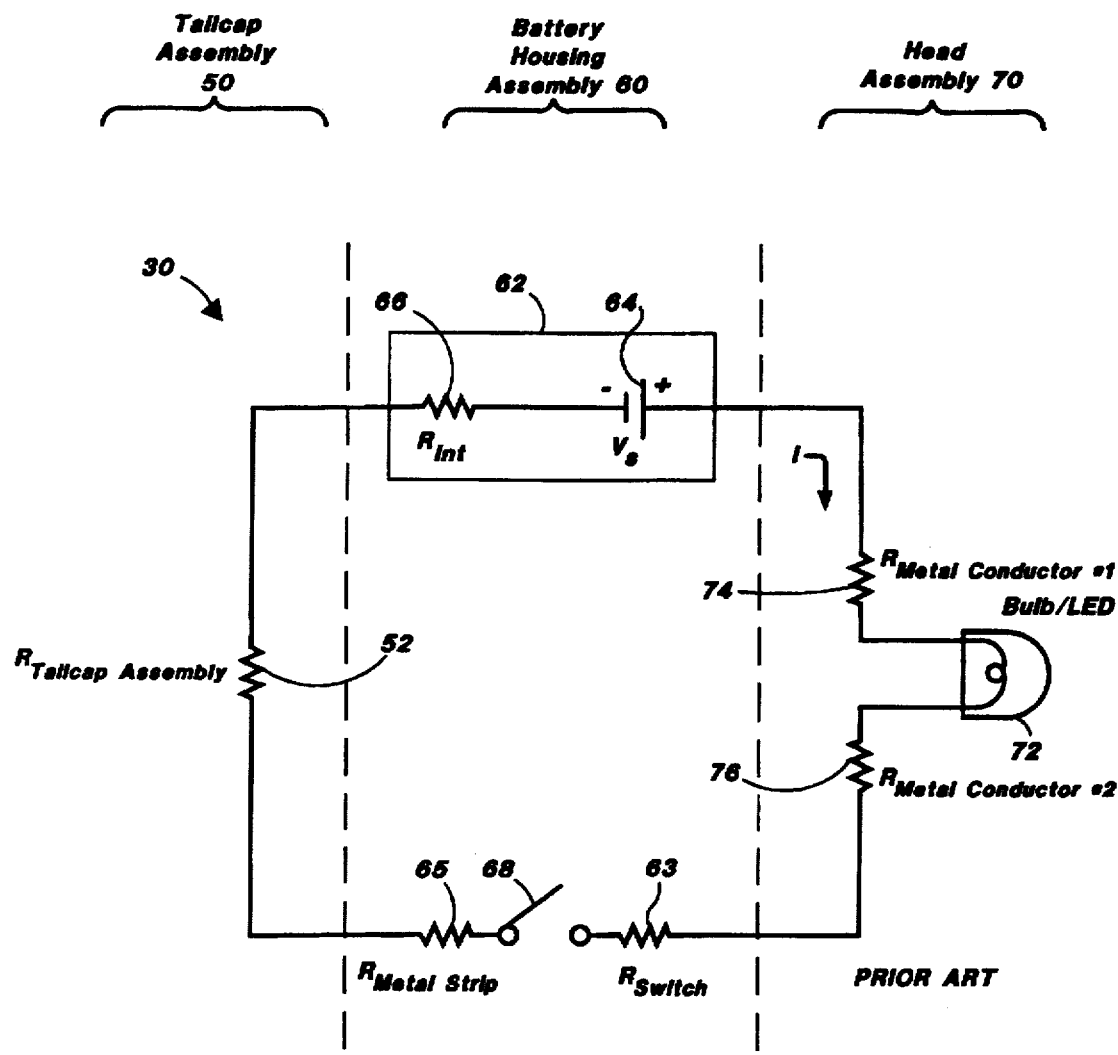
FIG. 1(a) shows a circuit diagram of a prior art flashlight.

FIG. 1(a) shows a circuit diagram of conventional prior art flashlight 30 comprising tailcap, battery housing, and head assemblies 50, 60, and 70, respectively. Battery/batteries 62 are disposed in battery housing assembly 60, and are characterized in having source voltage 64 ($V_S$) and internal resistance 66 ($R_{int}$). Battery/batteries 62 may be one or a plurality of dry cells, such as alkaline or heavy duty round cells, each such cell typically having an initial voltage of about 1.5 Volts. Bulb/LED 72 is disposed in head assembly 70, and may be an incandescent bulb or LED.

A first pathway electrically connects the cathode end of battery/batteries 62 to a first terminal of bulb/LED 72, and has an electrical resistance 74 (or $R_{Metal\ Conductor\ \#1}$). A second pathway electrically connects the second terminal of bulb/LED 72 to a first terminal of switch 68, and typically has two series electrical resistances: electrical resistances 63 (or $R_{switch}$) and 76 ($R_{Metal\ Conductor\ \#1}$). A third pathway electrically connects a second terminal of switch 68 to the anode end of battery/batteries 62, and has series resistances 65 (or $R_{metal\ strip}$) and 52 (or $R_{Tailcap\ Assembly}$). Resistance 65 is the electrical resistance of a metal strip, typically cuprous, where the strip is disposed between the second terminal of switch 68 and tailcap assembly 50. Resistance 52 is the electrical resistance of a tailcap metal spring to which the strip and the anode end of battery/batteries 62 are electrically connected.

Figure 1B:
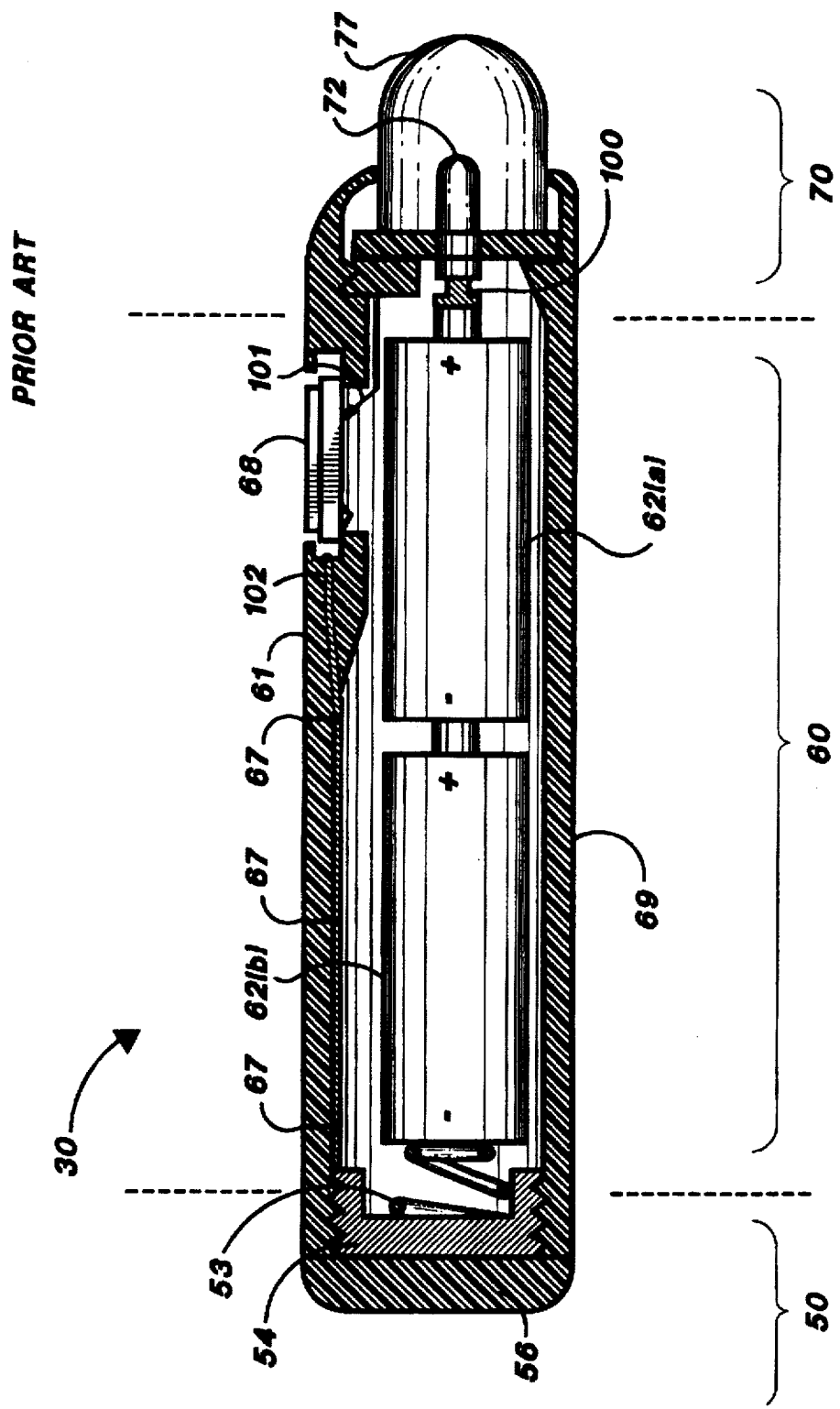
FIG. 1(b) shows a cross-section of a prior art flashlight corresponding to the circuit diagram of FIG. 1(a)

FIG. 1(b) shows a cross-section of prior art flashlight 30 corresponding to the circuit diagram of FIG. 1(a). Bulb/LED 72 is disposed at the forward end of flashlight 30 in head assembly section 70. Switch 68 selectively provides electrical current to bulb/LED 72, electrical current originating from voltage sources or dry cells 62(a) and 62(b). The cells are electrically connected in series. Dry cells 62(a) and 62(b) are contained in battery housing assembly 50, and held within electrically non-conductive, or substantially electrically non-conductive, battery housing sidewalls 61.

First conductor 100 electrically connects the cathode end of battery/batteries 62 to a first terminal of bulb/LED 72, the first conductor having an electrical resistance 74 (or $R_{Metal\ Conductor\ \#1}$). Optionally, the first terminal of bulb/LED 72 may contact the cathode terminal of cell 62(a) directly. Second conductor 101 electrically connects the first terminal of switch 68 to the second terminal of bulb/LED 72. Third conductor 102 is a metal strip which electrically connects the second terminal of switch 68 to the anode end of rearward dry cell 62(b), strip 102 being mechanically secured to sidewalls 61 by rivets 67.

Battery housing sidewalls 61 typically comprise substantially electrically non-conductive plastic. Optionally, battery housing sidewalls 61 comprise electrically conductive metal, in which case no third, separate electrical conductor 102 is required. Tailcap assembly 50 comprises electrically conductive metal spring 53, threaded electrically conductive base member 54, and cap 56. Spring 53 urges dry cells 62(a) and 62(b) forwardly so that physical and electrical contact with first electrical conductor 100 is established. Spring 53 is connected electrically and physically to the forward surface of threaded base member 54. The outer peripheral edge of base member 54 is threaded, and threadably engages the inner, threaded, rearmost portion of battery housing sidewalls 61. Base member 54 is electrically and physically connected to battery housing sidewalls 61. The rearward surface of threaded base member 53 is permanently secured to the forward surface of cap 56.

In FIG. 1(a) and others that follow, contact resistances between the negative terminal of cell 62(b) and spring 53, between the positive terminal of cell 62(a) and first conductor 100, and of switch 68, are assumed to be negligible and are therefore ignored.

Figure 2A:
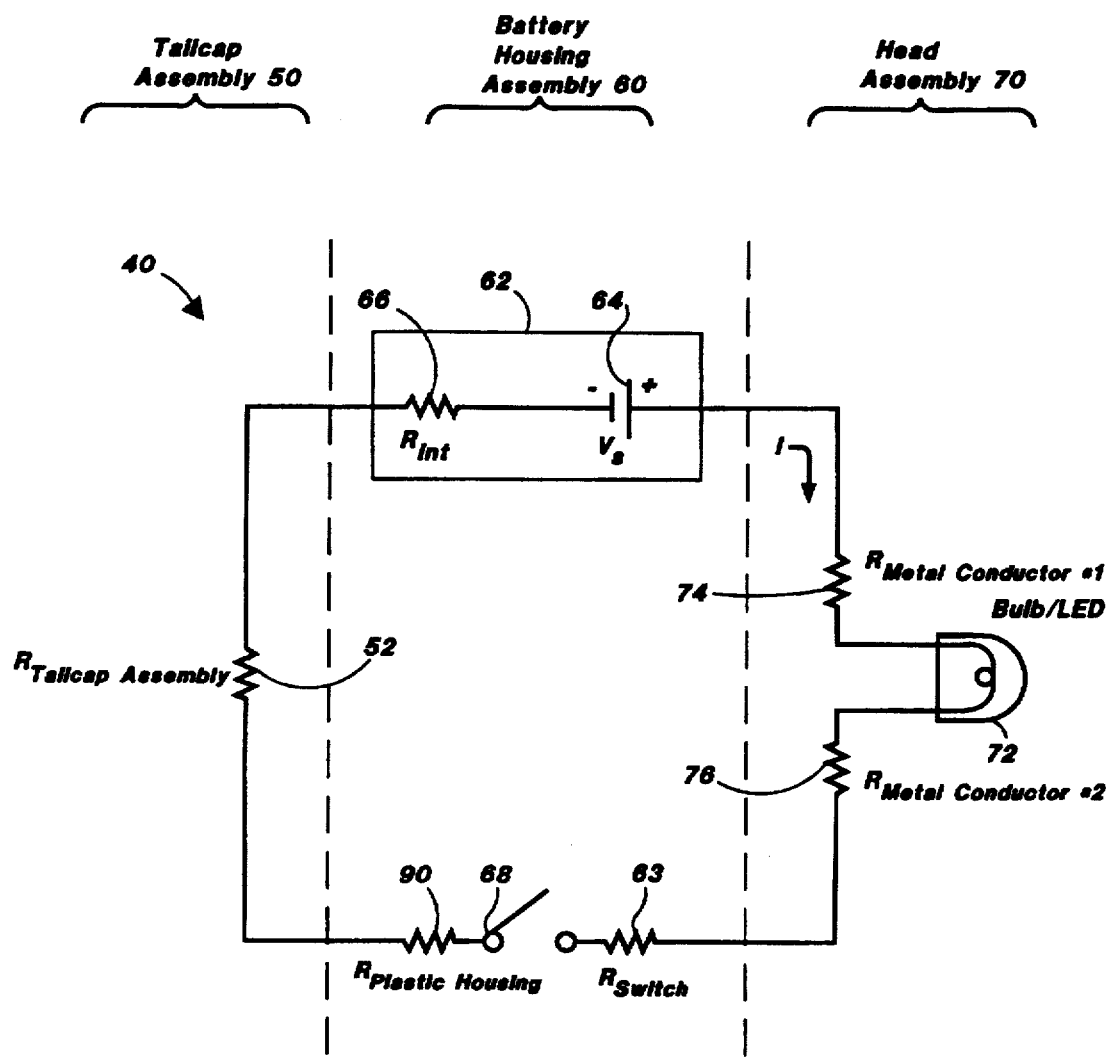
FIG. 2(a) shows a circuit diagram of a first embodiment of the invention.

FIG. 2(a) shows a circuit diagram of a first embodiment of the invention, where resistance 65 (or $R_{Metal\ Strip}$) of FIG. 1(a) is replaced with resistance 90 (or $R_{Plastic\ Housing}$) of FIG. 2(a). Resistance 90 is the electrical resistance of electrical circuit element 69 (electrically conductive plastic sidewalls, or battery housing) shown in FIG. 2(b). In FIG. 2(a) and other Figures following, $R_{Plastic\ Housing}$ is the lumped equivalent electrical resistance of the distributed electrical resistance of battery housing 69 between base member 54 and the second terminal of switch 68. Thus, sidewalls 69 form an electrically conductive element in the electrical circuit of flashlight 40. In FIG. 2(a) and others that follow, the self-inductances and capacitances of electrically conductive plastic components and assemblies are assumed to be negligible, and therefore ignored.

Figure 2B:
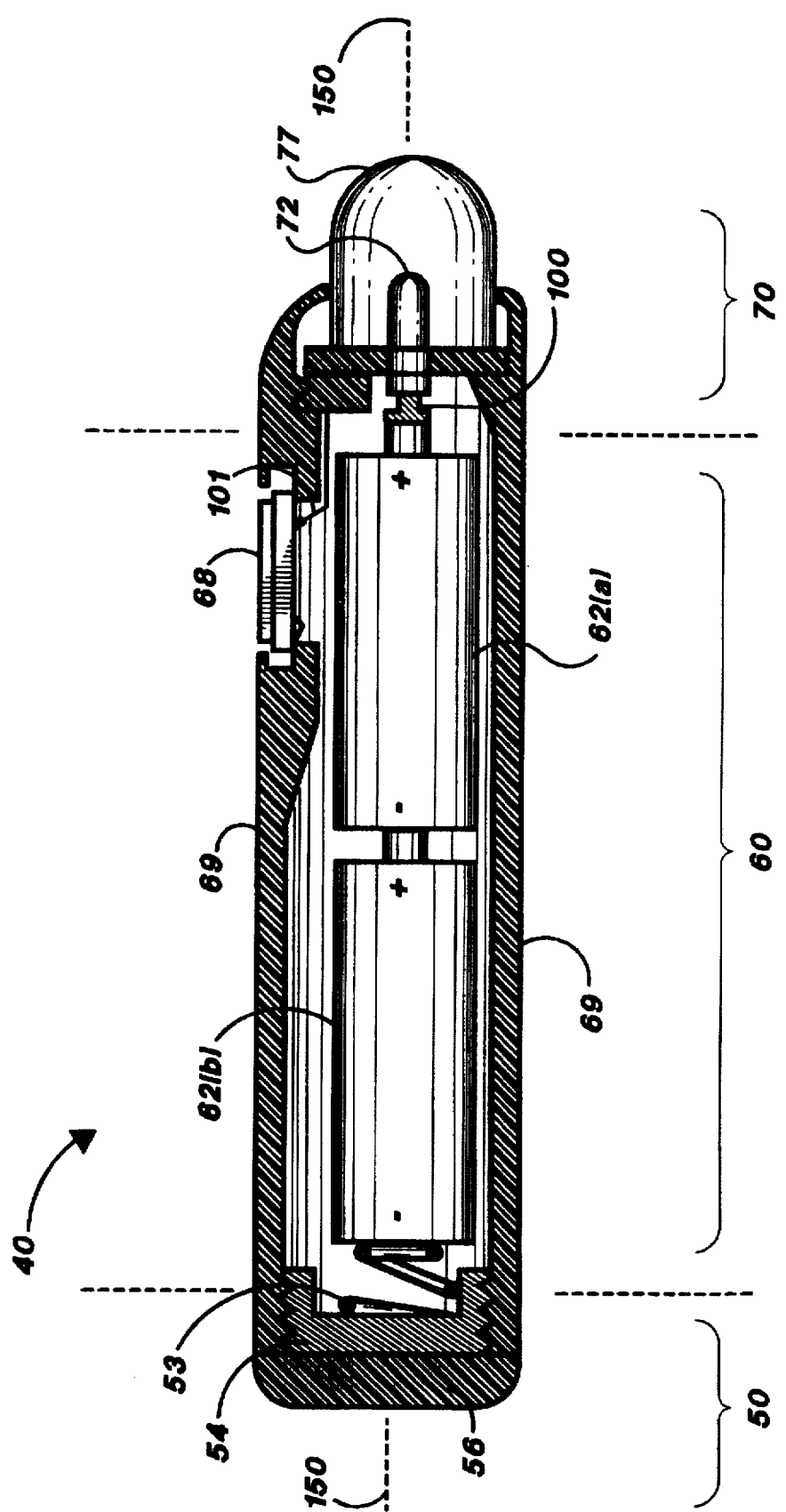
FIG. 2(b) shows a cross-section of a flashlight corresponding to the circuit diagram of FIG. 2(a)

FIG. 2(b) shows a cross-section of light source 40 corresponding to the circuit diagram of FIG. 2(a). The terms "flashlight," "lantern," and "light source" are used interchangeably in the specification and claims hereof, and may refer to a lantern, a flashlight, or any other hand-held, semi-stationary, semi-portable, or portable light source. The terms "assembly" and "component" are used interchangeably in the specification and claims hereof, and either term may mean an assemblage of disparate components that together form a particular assembly, or a particular discrete component of such an assembly.

In FIG. 2(b), sidewalls 69 are formed of electrically conductive plastic, and serve the dual functions of providing (a) a battery housing for dry cells 62(a) and 62(b), and (b) an electrical connection between the second terminal of switch 68 and the anode end of rearward dry cell 62(b). Thus, sidewalls 69 form a conductive element of the electrical circuit of light source 40. Note that in the first embodiment of the invention shown in FIG. 2(b), electrically conductive plastic sidewalls 69 replace, and perform the same electrical function as, separate metal strip 102 of FIG. 1(b). Additionally, sidewalls 69 impart structural integrity and shape to light source 40, as they house and contain dry cells 62(a) and 62(b).

As illustrated in FIG. 2(b), battery housing assembly 60 essentially comprises plastic sidewalls 69 (or battery housing 69). Plastic sidewalls 69 have a forward first end integrally and moldably connected to head assembly 70, and a rearward second end integrally and moldably connected to tailcap assembly 50. Other means of connecting the first end to the head assembly, and the second end to the tailcap assembly, fall within the scope of the invention, and include, but are not limited to, threadable, screwable, latchable, glueable, boltable, snapable, ultrasonic welding, and frictionally engaging means.

In a preferred embodiment of the invention, switch 68 is a 12 mm Panasonic D-K P8034S switch (or equivalent), and LED/bulb 72 is a Hewlett-Packard HLMP-8150 TS-A1 gallium arsenide LED providing an output of approximately 35 Candelas. LED/bulb 72 may include a lens integral thereto for collimating light in a forward or other direction. Lens member 77 may collimate and is substantially transparent to light emitted from LED/bulb 72. A particularly preferred material from which plastic sidewalls 69 may be formed is a substantially rigid, electrically conductive polymeric material available from Americhem, Inc. of Cuyahoga Falls, Ohio having the product designation 34237-C1 Black. This material is particularly well suited for use in flashlights having LEDs (as opposed to incandescent bulbs or fluorescent lamps). The series resistance of this material, when used to form sidewalls 69 in light source 40, was determined to range between about 20 Ohms and 100 Ohms, depending on the physical configuration of sidewalls 69. Battery housing 60 may be designed to contain one or a plurality of round dry cells of any of the conventional AAA, AA, C, or D sizes.

The terms "Bulb/LED," "incandescent bulb," "fluorescent lamp," and "LED" are used interchangeably in the specification and claims hereof. The term "light emitter" means any one or all the foregoing light generating elements.

Figure 3A:
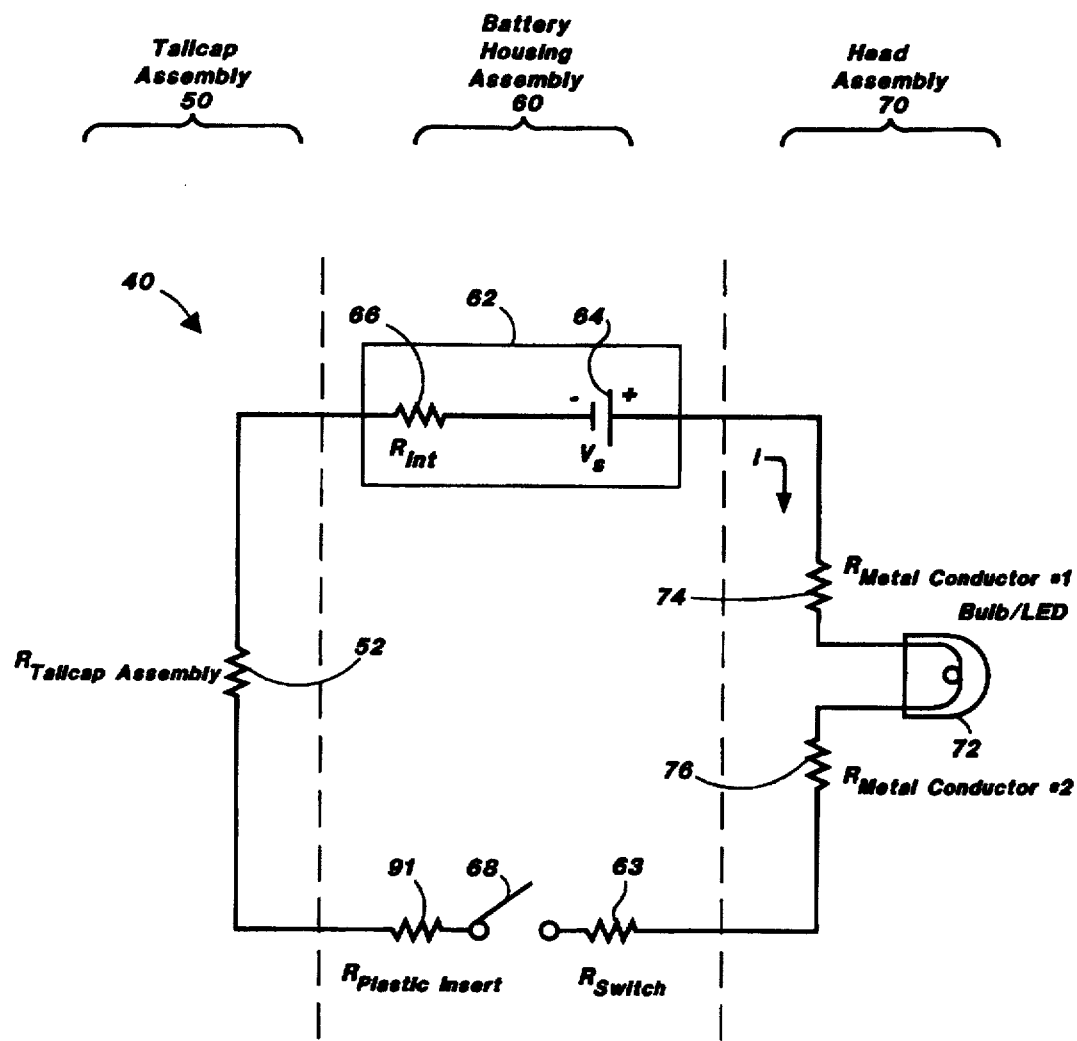
FIG. 3(a) shows a circuit diagram of a second embodiment of the invention.

FIG. 3(a) shows a circuit diagram of a second embodiment of the invention, where resistance 65 ($R_{Metal\ Strip}$) of FIG. 1(a) is replaced with resistance 91 (or $R_{Plastic\ Insert}$) of FIG. 3(a). Resistance 91 is the electrical resistance of electrical element 41 (electrically conductive plastic insert) shown in FIG. 3(b). $R_{Plastic\ Insert}$ is the lumped equivalent electrical resistance of the distributed electrical resistance of insert 41 between electrically conductive base member 54 and the second terminal of switch 68. Thus, plastic insert 41 forms an electrically conductive element in the electrical circuit of light source 40.

Figure 3B:
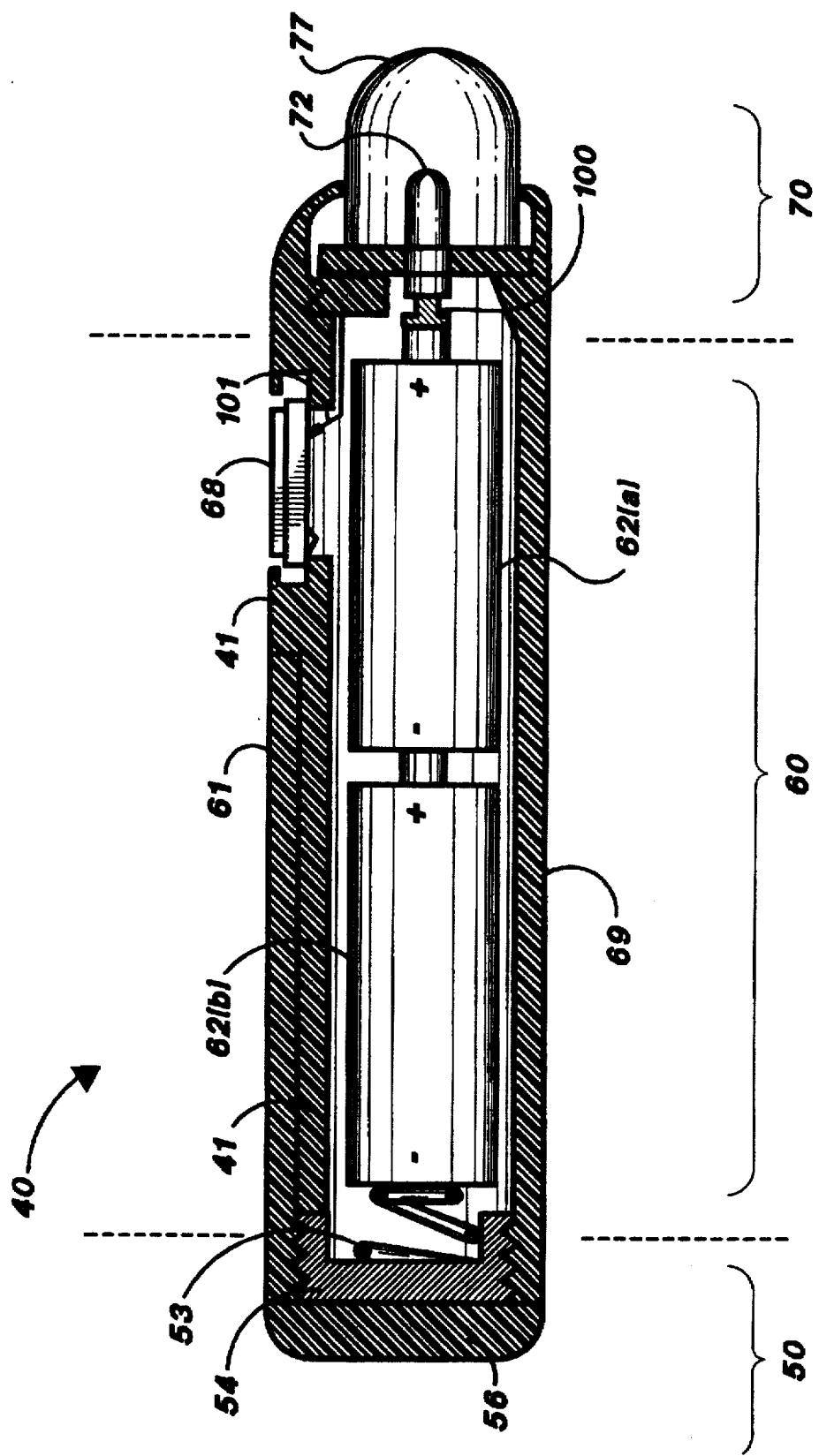
FIG. 3(b) shows a cross-section of a flashlight corresponding to the circuit diagram of FIG. 3(a)

FIG. 3(b) shows a cross-section of light source 40 corresponding to the circuit diagram of FIG. 3(a). Electrically conductive plastic insert 41 shown in FIG. 2(b) replaces, and performs the electrical same function as, metal strip 102 of FIG. 1(b). Electrically conductive plastic insert 41 electrically connects the second terminal of switch 68 to the anode end of rearward dry cell 62(b). In FIG. 3(b), sidewalls 61 are formed of an electrically non-conductive plastic material. Plastic insert 41 may be molded into, and form a portion of, sidewalls 61, and thus eliminate the need to attach metal strip 102 to sidewalls 61 by mechanical securing means 67. Optionally, plastic insert 41 may be attached by glueable, mechanical, or other means to sidewalls 61. In the second embodiment of the invention, plastic insert 41 need not impart substantial structural integrity or physical shape to light source 40, but instead may function primarily as an electrical conductor only.

Figure 4A:
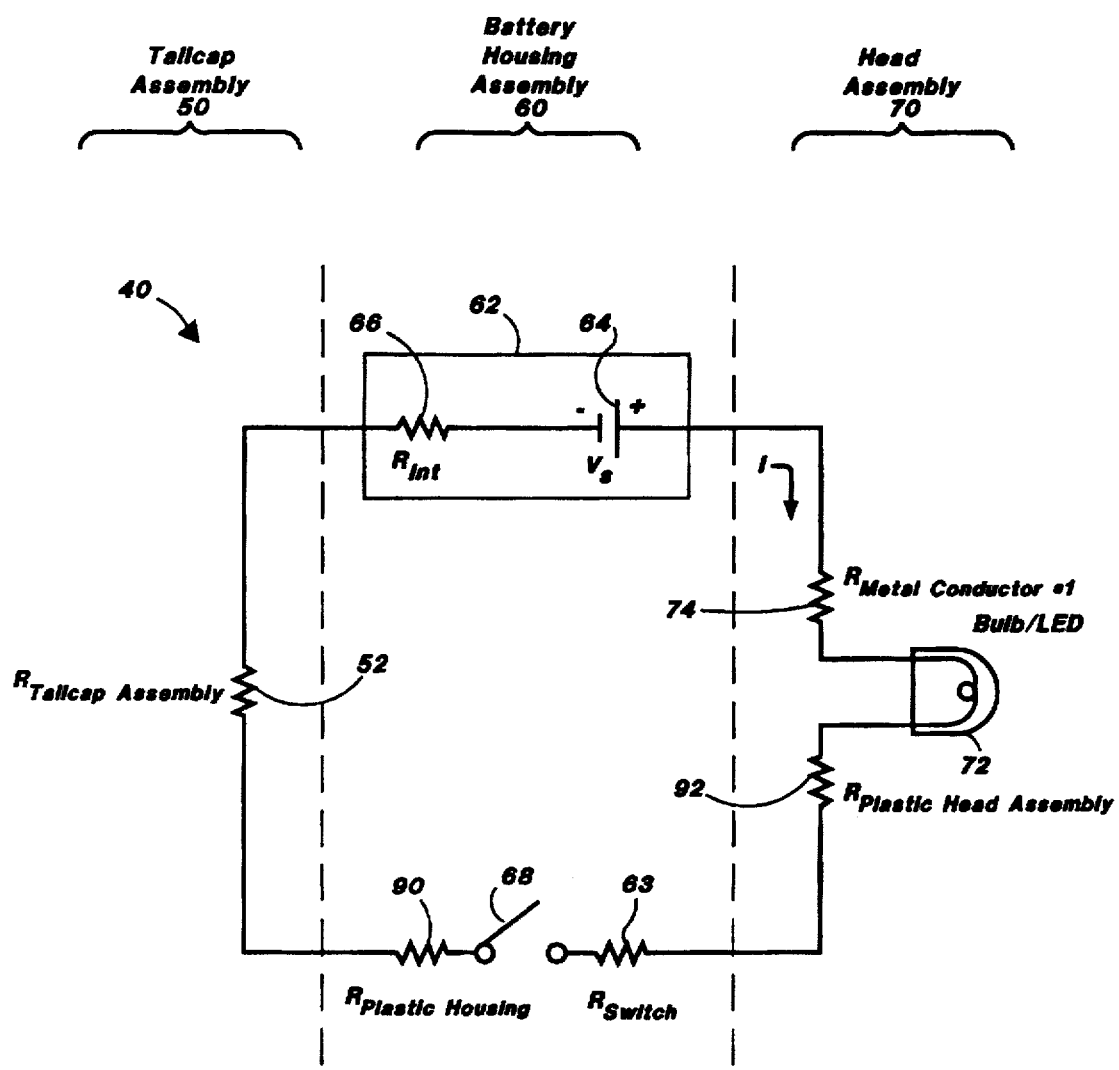
FIG. 4(a) shows a circuit diagram of a third embodiment of the invention.

FIG. 4(a) shows a circuit diagram of a third embodiment of the invention, where resistance 76 ($R_{Metal\ Conductor\ \#2}$) of FIG. 1(a) is replaced with resistance 92 (or $R_{Plastic\ Head\ Assembly}$) of FIG. 3(a). Resistance 92 is the electrical resistance of electrical circuit element 73 (electrically conductive plastic head assembly 73) shown in FIG. 4(b). $R_{Plastic\ Head\ Assembly}$ is the lumped equivalent electrical resistance of the distributed electrical resistance of plastic head assembly 73 between the first terminal of switch 68 and the second terminal of bulb/LED 72. Thus, plastic head assembly 73 forms an electrically conductive element in the electrical circuit of light source 40.

Figure 4B:
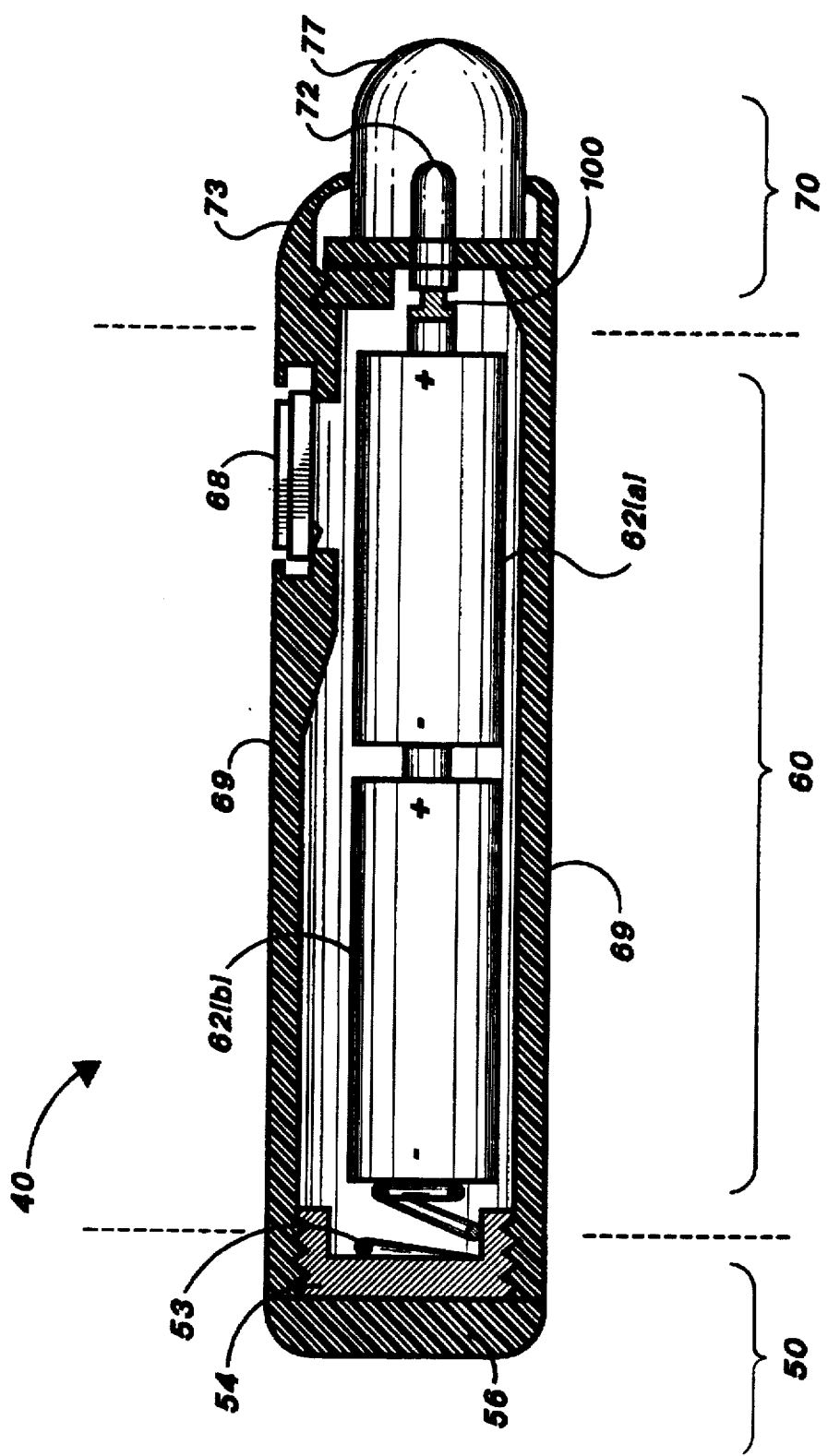
FIG. 4(b) shows a cross-section of a flashlight corresponding to the circuit diagram of FIG. 4(a)

FIG. 4(b) shows a cross-section of light source 40 corresponding to the circuit diagram of FIG. 4(a). In FIG. 4(b), plastic head assembly 73 is formed of an electrically conductive plastic material, and electrically connects the first terminal of switch 68 to the second terminal of bulb/LED 72. Thus, electrically conductive plastic head assembly 73 replaces, and performs the same electrical function as, second conductor 101 of FIG. 1(b). Head assembly 73 also imparts structural integrity and shape to light source 40, as it houses bulb/LED 72, and further may house a reflector for collimating light from bulb/LED 72 forwardly, or an optical window disposed frontwardly of the reflector and substantially perpendicular to the light rays collimated thereby.

Figure 5A:
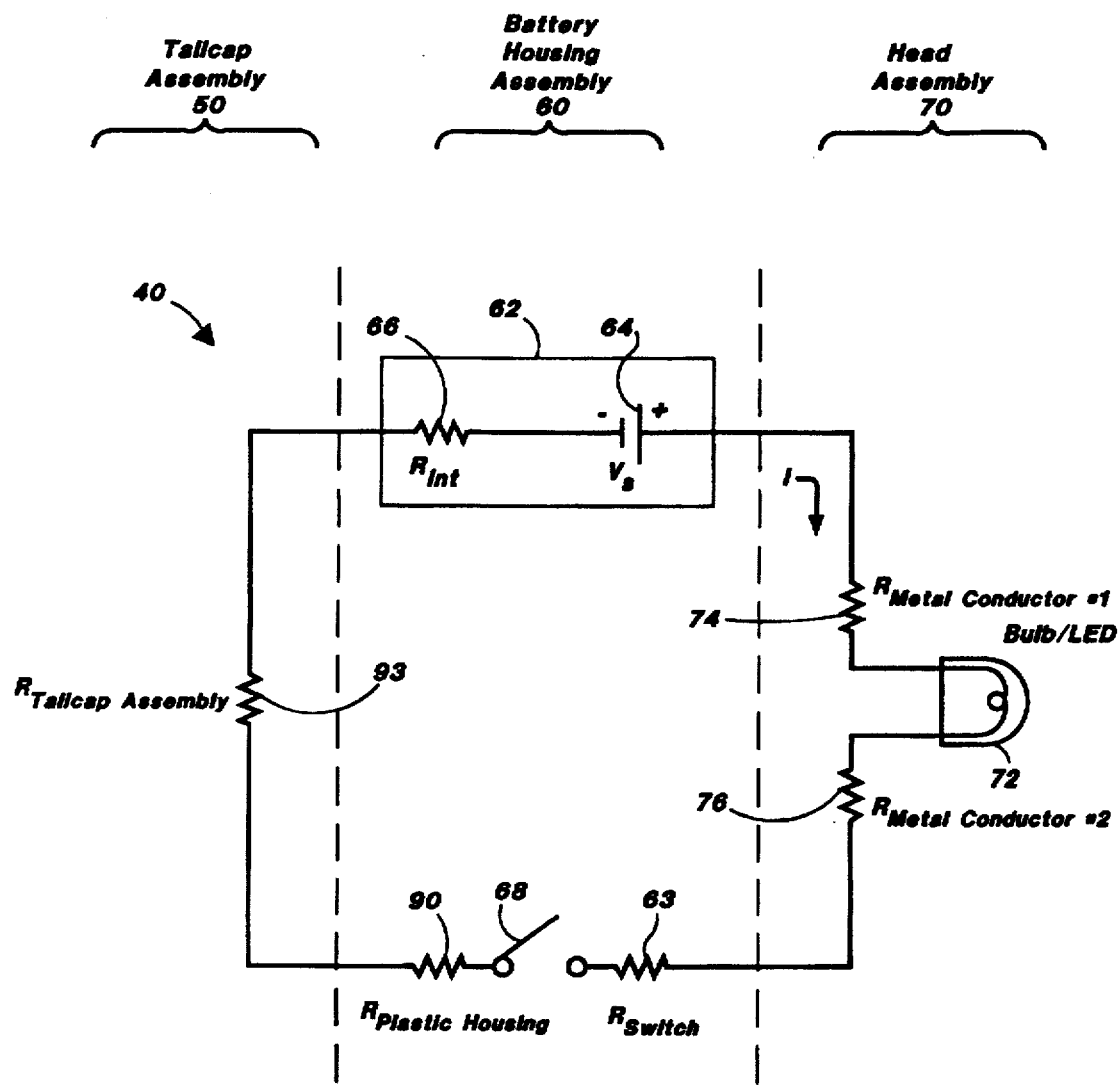
FIG. 5(a) shows a circuit diagram of a fourth embodiment of the invention.

FIG. 5(a) shows a circuit diagram of a fourth embodiment of the invention, where resistance 52 ($R_{Tailcap\ Assembly}$) of FIG. 1(a) is replaced with resistance 93 (or $R_{Plastic\ Tailcap}$) of FIG. 5(a), and resistance 65 ($R_{Metal\ Strip}$) of FIG. 1(a) is replaced with resistance 90 (or $R_{Plastic\ Housing}$). Resistances 90 and 93 are the electrical resistances of electrical circuit elements 69 (electrically conductive plastic sidewalls) and 57 (electrically conductive plastic tailcap) shown in FIG. 5(b). $R_{Plastic\ Tailcap}$ is the lumped equivalent electrical resistance of the distributed electrical resistance of plastic tailcap 57 between spring 53 and sidewalls 69. Thus, plastic tailcap 57 forms an electrically conductive to element in the electrical circuit of light source 40.

Figure 5B:
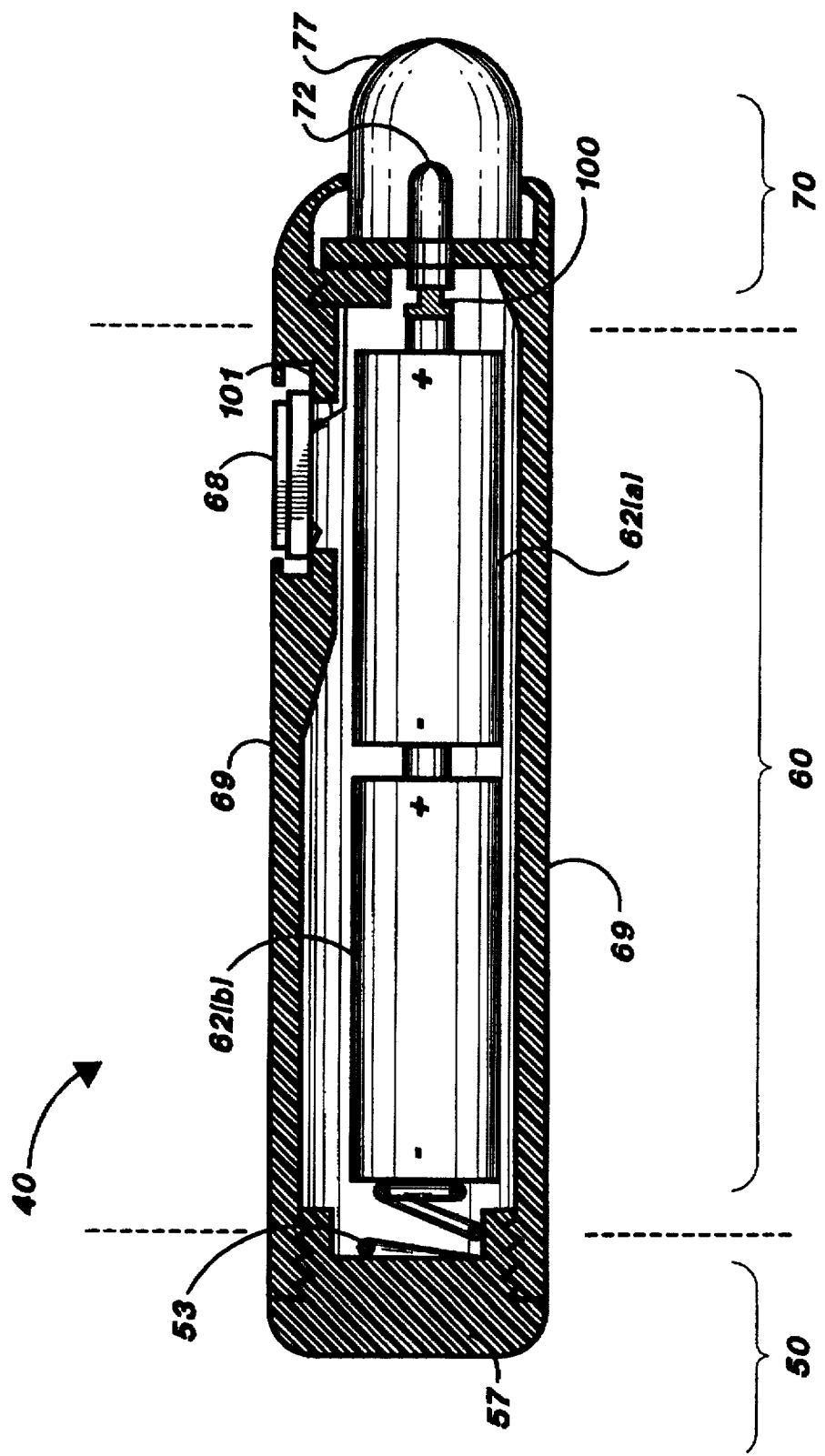
FIG. 5(b) shows a cross-section of a flashlight corresponding to the circuit diagram of FIG. 5(a)

FIG. 5(b) shows a cross-section of light source 40 corresponding to the circuit diagram of FIG. 5(a). Electrically conductive plastic tailcap 57 replaces, and performs the same electrical function as, threaded electrically conductive base member 54 of FIG. 1(b). Plastic tailcap 57 electrically connects the anode end of rearward dry cell 62(b) to electrically conductive plastic sidewalls 69. Electrically conductive plastic sidewalls 69 replace, and perform the same electrical function as, separate metal strip 102 of FIG. 1(b). Additionally, sidewalls 69 and tailcap 57 impart structural integrity and shape to light source 40.

Figure 6A:
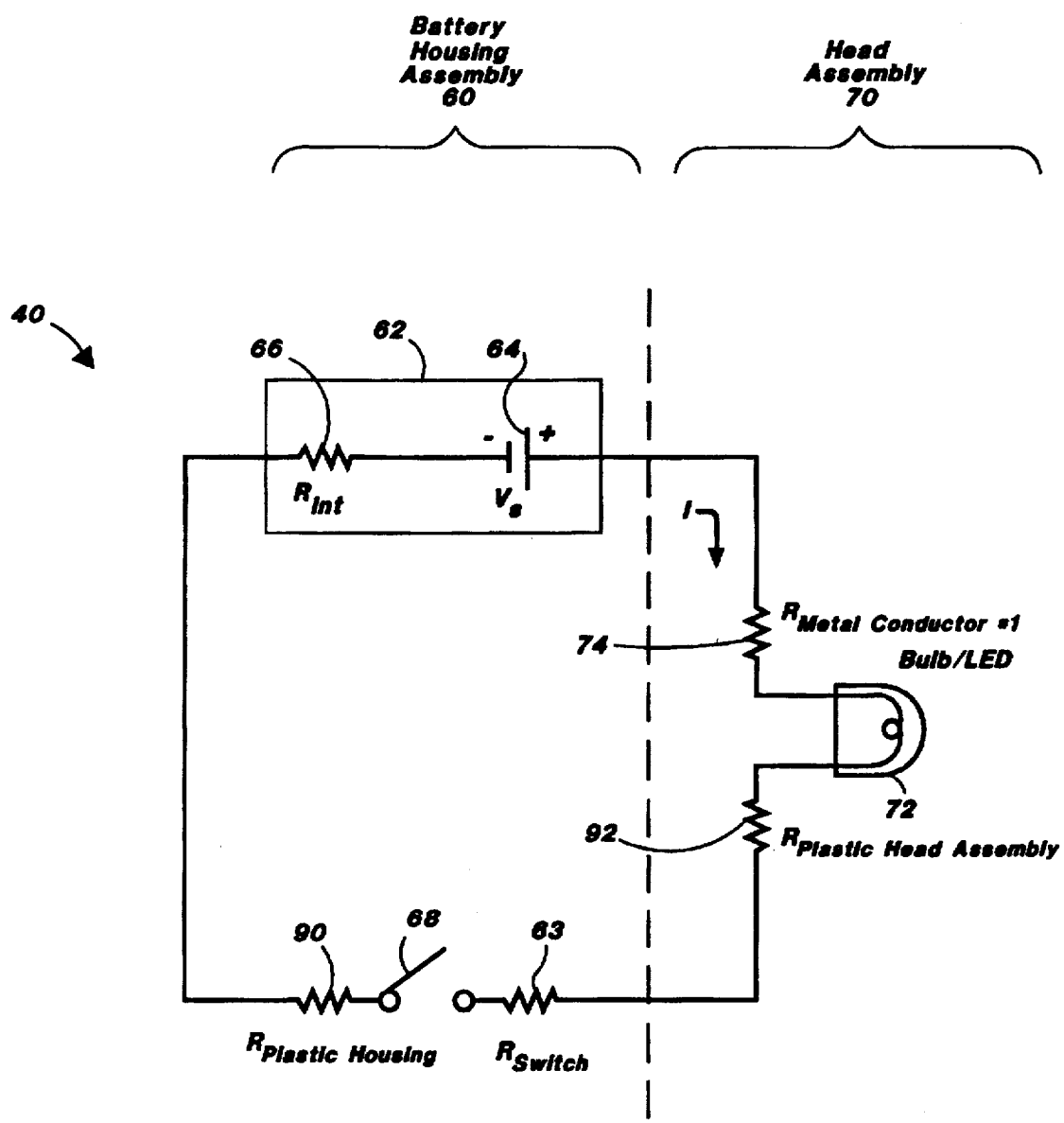
FIG. 6(a) shows a circuit diagram of a fifth embodiment of the invention.

FIG. 6(a) shows a circuit diagram of a fifth embodiment of the invention. Resistances 52 ($R_{Tailcap\ Assembly}$), 65 ($R_{metal\ strip}$), and 76 ($R_{Metal\ Conductor\ \#2}$) of FIG. 1(a) are replaced with resistances 90 ($R_{Plastic\ Housing}$) and 92 ($R_{Plastic\ Head\ Assembly}$) in FIG. 6(a). Resistances 90 and 92 are the electrical resistances of electrical circuit elements 69 (electrically conductive plastic sidewalls) and 73 (electrically conductive plastic head assembly) shown in FIG. 6(b). $R_{Plastic\ Housing}$ in FIG. 6(a) is the lumped equivalent electrical resistance of the distributed electrical resistance of battery housing 69 between spring 53 and the second terminal of switch 68. Thus, battery housing 69 and plastic head assembly 73 form electrically conductive elements in the electrical circuit of light source 40.

Figure 6B:
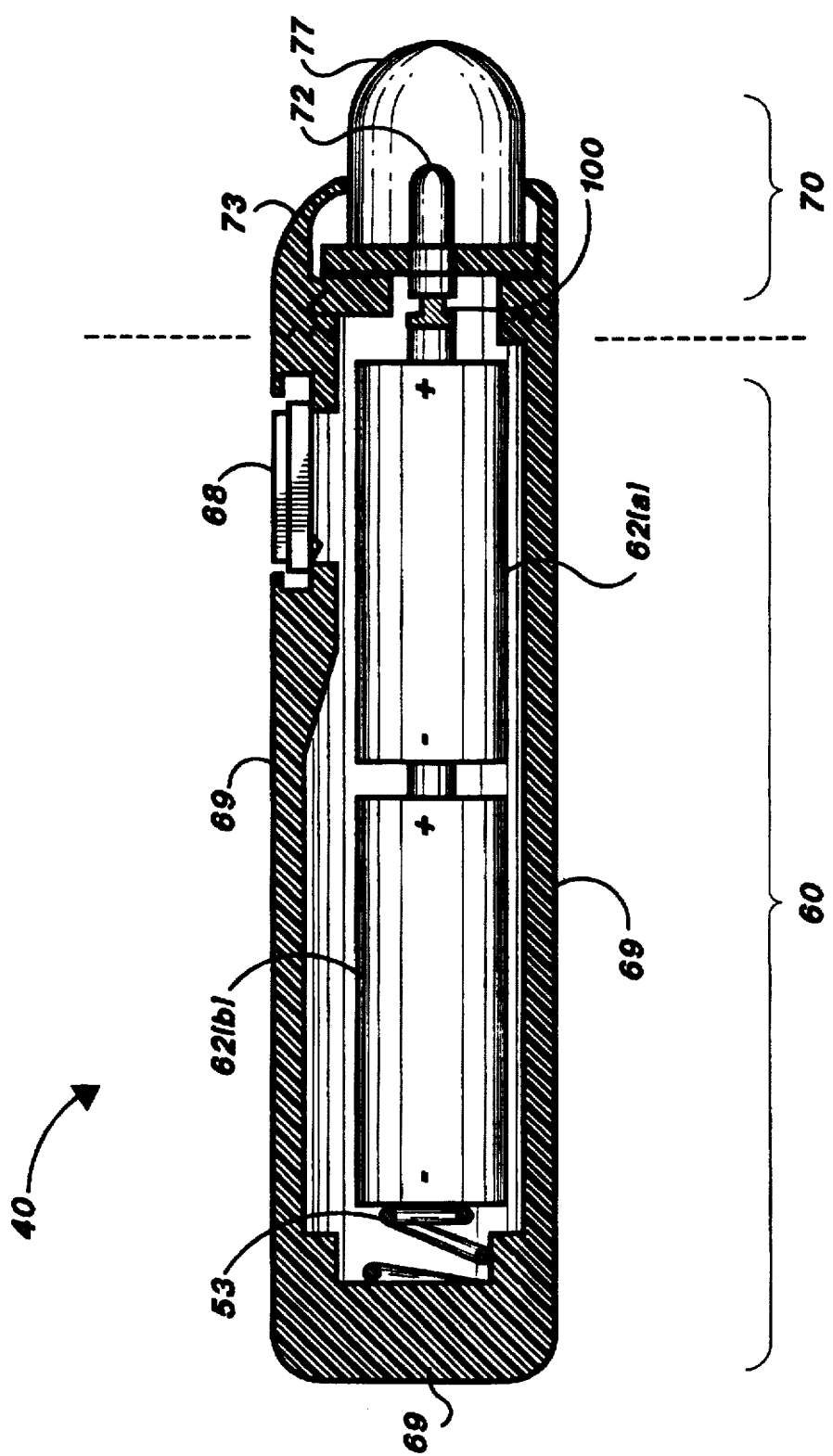
FIG. 6(b) shows a cross-section of a flashlight corresponding to the circuit diagram of FIG. 6(a)

FIG. 6(b) shows a cross-section of light source 40 corresponding to the circuit diagram of FIG. 6(a). Battery housing 69 replaces, and performs the same electrical function as, threaded electrically conductive base member 54 and metal strip 102 of FIG. 1(b). Battery housing 69 electrically connects the anode end of rearward dry cell 62(b) to the second terminal of switch 68. Electrically conductive plastic head assembly 73 replaces, and performs the same electrical function as, metal conductor 101 of FIG. 1(b). Plastic head assembly 73 electrically connects the first terminal of switch 68 to the second terminal of bulb/LED 72, and threadably or otherwise connects to the first end of battery housing 69. Additionally, battery housing 69 and head assembly 73 impart structural integrity and shape to light source 40.

Figure 7:
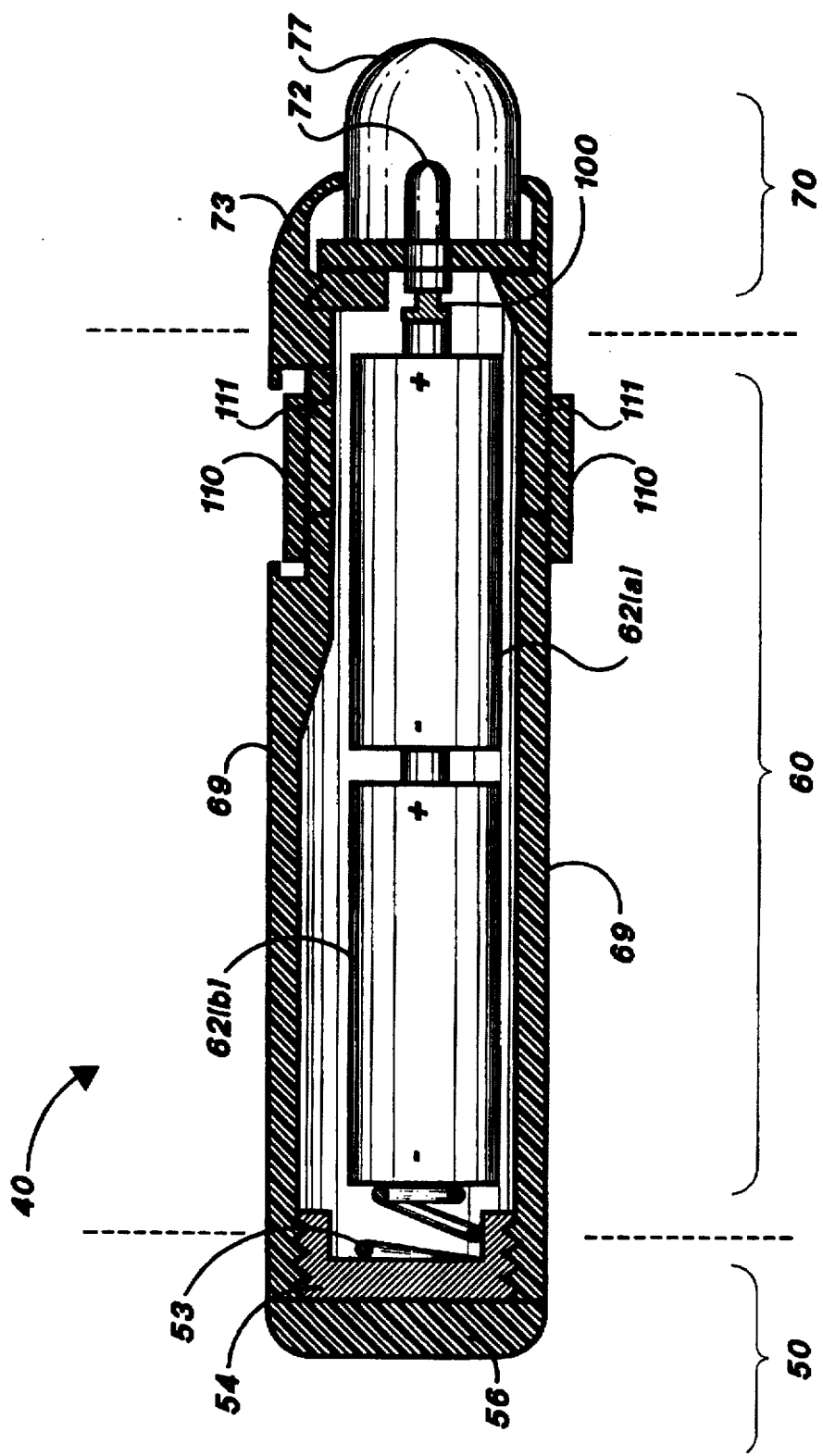
FIG. 7 shows a cross-section of a sixth embodiment of the invention.

FIG. 7 shows a cross-section of a sixth embodiment of the invention. Ring switch 110 is formed of electrically conductive plastic, and frictionally engages and slides along the exterior, outer surface of electrically conductive plastic sidewalls 69 and electrically non-conductive spacer member 111. As switch 110 is pushed by a user to its rearwardmost position, the electrical circuit of light source 40 opens as the forwardmost portion of ring switch 110 disengages from electrically conductive head assembly 73 and at its forward end engages only the outer surface of electrically non-conductive spacer 111. When switch 110 is pushed by a user to its forwardmost position, the electrical circuit of light source 40 closes as switch 110 establishes simultaneous electrical and physical contact at its front end with electrically conductive plastic head assembly 73 and at its rear end with electrically conductive plastic sidewalls 69. Thus, switch 110 is an electrically conductive element in the electrical circuit of light source 40, imparts structural integrity and shape thereto, and permits a user to selectively energize and de-energize LED/light bulb 72.

Figure 8:
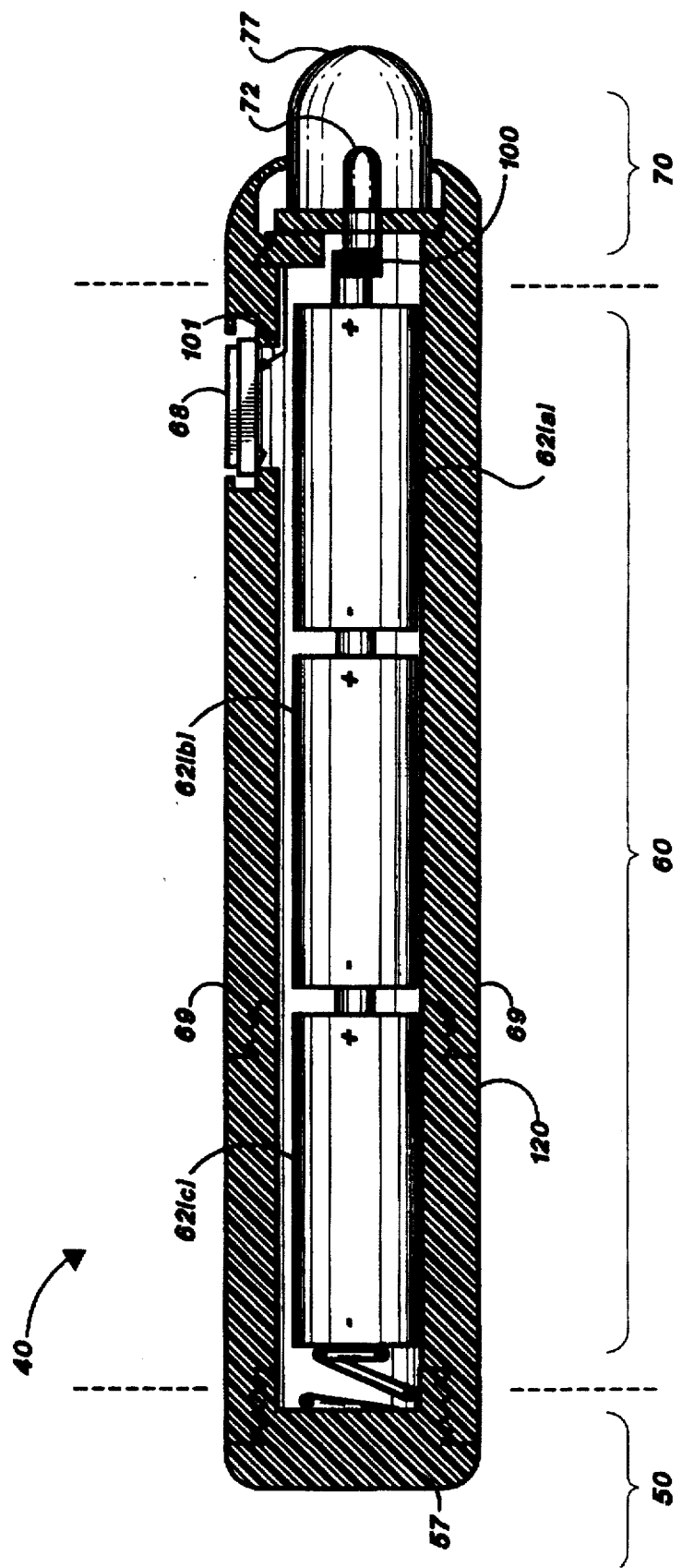
FIG. 8 shows a cross-section of a seventh embodiment of the invention.

FIG. 8 shows a cross-section of a seventh embodiment of the invention. Battery housing extension 120 is formed of electrically conductive plastic, and is threadably connected at its forward end to electrically conductive plastic sidewalls 69. At its rearward end, battery housing extension 120 is threadably connected to electrically conductive plastic tailcap 57. Battery housing 120 forms an electrically conductive element in the electrical circuit of light source 40, imparts structural integrity and shape thereto, and permits additional dry cell 62(c) to fit therewithin.

Other mechanical means and arrangements for connecting battery housing extension 120 to light source 40 fall within the scope of the present invention. For example, battery housing extension 120 may be disposed between the first end of battery housing assembly 60 and head assembly 70, or may be disposed between the second end of battery housing assembly 60 and tailcap assembly 50. Battery housing extension 120 may be connected to the first end and to the head assembly, or to the second end and the tailcap assembly, by threadable, screwable, latchable, glueable, boltable, snapable, ultrasonic, frictionally engaging, or other means.

Figure 9:
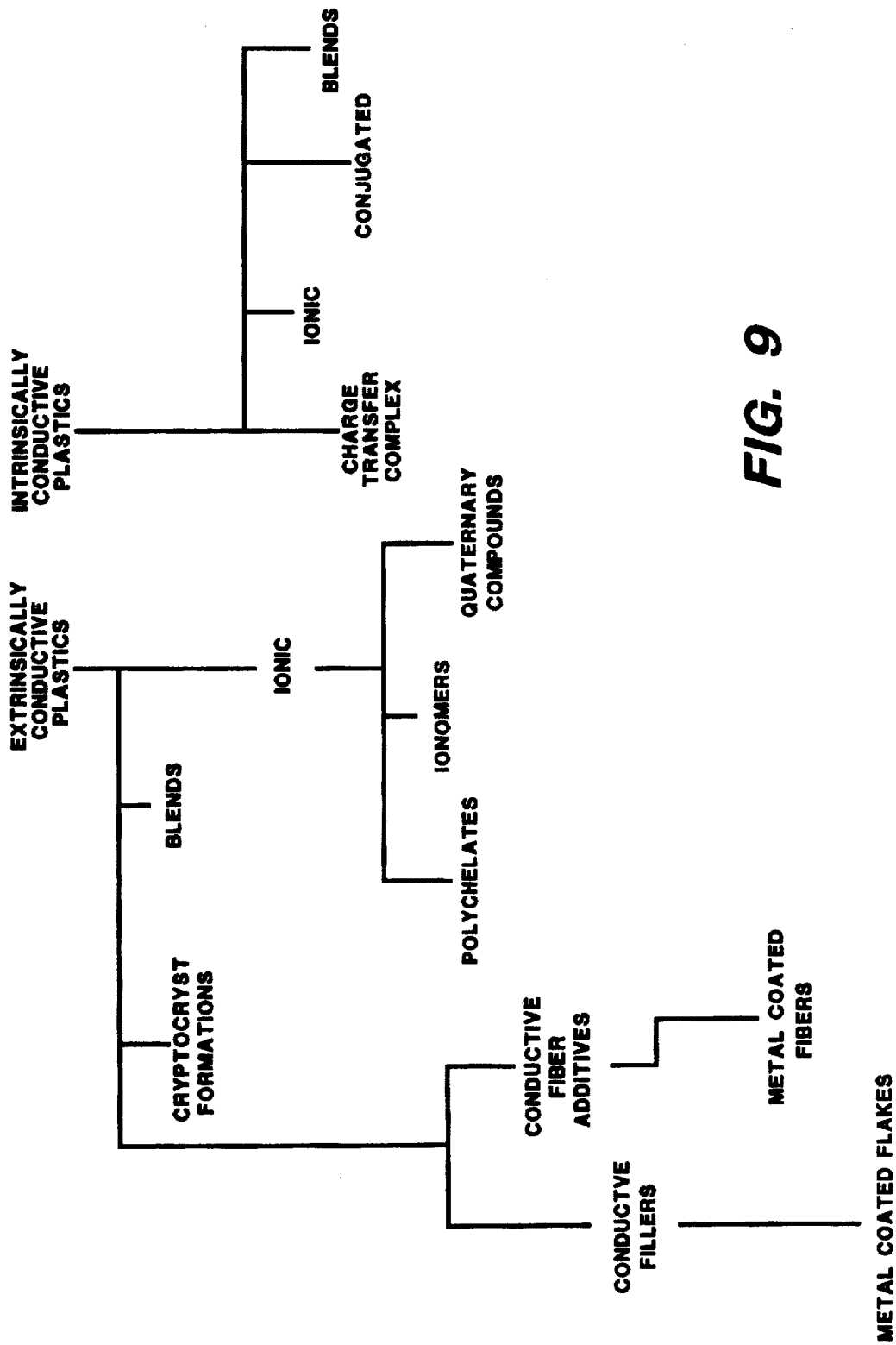
FIG. 9 shows different types of electrically conductive plastics for use in the invention.

FIG. 9 shows different types of electrically conductive plastics finding application in the invention. As used in the specification and claims herein, the term "electrically conductive plastic" includes, but is not limited to, (1) all materials shown in FIG. 9; (2) easily deformable electrically conductive materials containing polymers and having low modulae of elasticity; (3) electrically conductive polymers; (4) electrically conductive materials such as resins which have high molecular weight repeating structures in the organic and silicon families; (5) electrically conductive polymeric materials of large molecular weight that can be extruded, molded, cast, or shaped by flow, and that optionally include fillers, plasticizers, pigments, or stabilizers, and (6) electrically conductive materials made of giant molecules formed by the union of simple molecules (e.g., monomers).

FIG. 9 shows that "electrically conductive plastics" include two broad categories: "extrinsically conductive plastics," and "intrinsically conductive plastics." As used herein, the term "extrinsically conductive plastics" means electrically conductive plastics that: (a) have a resin, matrix, or base material from which electrical circuit elements of the invention are formed; (b) have no appreciable or substantial electrical conductivity themselves; and (c) have the electrical conductivity required to practice the invention imparted to them by the addition of other materials to the resin, matrix, or base material. As shown in FIG. 9, those other electrically conductive materials include: (a) electrically conductive fillers; (b) electrically conductive fiber additives; (c) cryptocryst formations; (d) ionically conducting polychelates; (e) ionically conducting ionomers, and (f) ionically conducting quaternary compounds. The terms "resin," "matrix," and "base material" are used interchangeably in the specification and claims hereof, and refer to, but are not limited to mean only, the starting material of an extrinsically conductive plastic.

Examples of "extrinsically conducting plastics" include, but are not limited to: (a) conductive filler materials like carbon black, graphite, and metal or nickel coated flakes such as those disclosed by Kidd in 1989, at pp. 467–468; (b) conductive fiber additive materials such as 8 micron diameter 304 stainless steel fibers, or metal or nickel-coated fibers similar to those disclosed by Kidd in 1989 at pp. 467–469; (c) cryptocryst formation materials such as those disclosed in U.S. Pat. No. 2,864,774 (which is hereby incorporated by reference in its entirety); (d) ionically conducting polychelate materials having complexes with metal salts such as POLYTHIOUREA® with copper; (e) ionically conducting ionomer materials such as DUPONT® SURLYN®; (f) ionically conductive quaternary compound materials such as EPICHLOROHYDRIN® with dimethylamine.

As used herein, the term "intrinsically conductive plastics" means doped or undoped electrically conductive plastics that: (a) have the electrical conductivity necessary to practice the invention without other materials being added thereto; and (b) constitute the material from which electrically conductive circuit elements of the invention are formed. As shown in FIG. 9, "intrinsically conductive plastics" include plastics and polymers that may be categorized as: (a) charge transfer complex materials; (b) ionic materials; (c) conjugated materials; and (d) blended materials.

Examples of "intrinsically conducting plastics" include, but are not limited to: (a) charge transfer complex materials such as Poly (4-hydroxystyrene) with (4-(hexyloxy) phenyl) (4-nitrophyenyl)); (b) ionic materials such as POLYIMIDE® or KAPTON®; (c) conjugated materials such as polyaniline VERSICON® or polyacetylene as disclosed by Aldissi in 1993 at page 84; and (d) blended materials such as INCOBLEND® as disclosed by Aldissi in 1993 at page 84 (INCOBLEND® is a PVC blend containing 27% polyaniline for compression molding purposes).

Other examples of electrically conductive plastics finding application in the invention include the following materials: hydrocarbon-based electrically conductive polymers, transpolyacetylene, carbon-filled PVC, markite plastics, tetracyanoquinodimethane (TCNQ) (CT salt), tetrathiafulvane (TTF) (CT salt), tetramethyltetraselafulvalene (TMTSF) (CT salt), Bis (ethylenedithiolo) tetrathiafulvalense (BEDT-TTF) (CT salt), Polythiazyl (inherent/doped), polythiophene (inherent/doped), polyacetylene (doped), polyaniline (doped), poly-p-phenylene (inherent/doped), poly-p-phenylene vinylene (doped), poly-p-phenylene sulfide (doped), poly (benzene) (doped), poly (anthracene) (doped), poly (napthalene) (doped), polytrimethylsilylacetylene (PTMSA) (inherent/doped), poly (1,6 heptadiene) (inherent), polyethylene succinate (doped), polyethylene oxide (doped), polypropylene oxide (doped), polyvinyl acetate (doped), polyphtalonitrile (ineherent/doped), poly-n-propylaziridine (doped), potythiazyl (inherent), phthalocyanine/kevlar (doped), phthalonitride, naphthalocyanine/fluoroaluminum (doped), naphthalocyanine/fluorogallium (doped), poly (phenylene-vinylene) doped), polycarbozole, polyphosphazines (inherent/doped), carboranylmethyl-substituted phosphazines (inherent/doped), polyalkyl carbozoyl (doped), polyquinoline, polyacene quinone (inherent), polybismethylene hydroquinone (doped), polypyridyl methylquinoline (inherent/doped), poly-n-propylaziridine (doped), polypyrroles (doped/ion implant), polyphosphazines (inherent), and polydimethyl phenylene oxide (doped/ion implant).

Electrically conductive plastics of the present invention include the so-called "doped polymers." Some varieties of electrically conductive plastics or polymers such as poly (phenylene sulfide) have traditionally been considered as electrically insulative materials that become electrically conductive upon exposure to certain oxidizing or reducing agents such as iodine and arsenic pentafluoride. Those agents are frequently referred to as "dopants" due to their apparent similarity to dopants used to modify the chemical properties of semiconductor materials. This somewhat helpful analogy should not be carried too far, however. The amount of "dopant" required to render an otherwise electrically insulative plastic or polymer to become electrically conductive is usually much greater than the amount of "dopant" used to alter the electrical characteristics of conventional semiconductor materials. As applied to the manufacture of compositions of matter for semiconductors, the term "dopant" typically means a material employed in concentrations characteristic of an impurity. As used herein, however, the term "dopant" means a material employed in relatively large concentrations to alter or increase the electrical conductivity of a plastic or polymer, and in amounts approaching or even exceeding 40 mole percent. Furthermore, the morphology of an electrically conductive plastic may affect significantly the amount of dopant that can be incorporated therein, and hence may have a significant impact on its resulting electrical conductivity. For example, crystalline poly (phenylene sulfide) does not exhibit a significant change in its electrical conductivity upon exposure to oxidants, but amorphous poly (phenylene sulfide) readily reacts upon exposure to such dopants, and thereafter exhibits a conductivity of about 1 Ohm$^{-1}$ cm$^{-1}$. Thus, as used herein the term "doped electrically conductive plastic" or "doped electrically conductive polymer" means materials having substantial concentrations of a selected dopant or dopants.

Particularly useful discussions of the foregoing and other materials, some of which find application in the present invention, may be found in the publications listed in Table 1 below.

TABLE 1

| Electrically Conductive Plastic Publications | | | |
|---|---|---|---|
| Author | Title | Journal/Publisher | Date |
| Aldissi, M. | "Inherently Conducting Polymers" | Noyes Data Corp | 1989 |
| Aldissi, M. | "Intrinsically Conducting Polymers" | Kluwer Academic Publishers | 1993 |
| Americhem | "Data Sheet on Conductive Polyvinyl Chloride" | Americhem, Inc. | 1992 |
| Bigg, D. | "Conductive Polymeric | Polymer Engineering | 1977 |

TABLE 1-continued

Electrically Conductive Plastic Publications

| Author | Title | Journal/Publisher | Date |
|---|---|---|---|
| | Compositions" | and Science, vol. 17, pp. 842–847. | (Dec.) |
| Coler, M. | "Properties of Conductive Plastics" (Markites) | Electronics pp. 96–99. | 1949 (Oct.) |
| Cotts et al. | "Electrically Conductive Organic Polymers for Advanced Applications" | Noyes Data Corp. | 1986 |
| Eisenbaumer et al. | "Processible, Environmentally Stable, Highly Conductive Forms of Polythiophene" | Synthetic Metals Elsevier Sequoia vol. 18, pp. 277–282 | 1987 |
| Kaner et al. | "Plastics that Conduct Electricity" | Scientific American, pp. 106–111. | 1988 (Feb.) |
| Kidd, S. | "Electrically Conductive Plastics - A Comparison of Properties" | 21st International SAMPE Technical, pp. 466–472. | 1989 (Sep.) |
| Kirk et al. | "Encyclopedia of Chemical Technology" | John Wiley & Sons, 3rd Ed., vol. 18, pp. 745–793. | 1982 |
| Kulkarni et al. | "Processible Intrinsically Conductive Polymer Blends" | ANTEC '91 pp. 663–664 | 1991 |
| Lupinski, J. H. | "Electrically Conductive Plastics" | Science, pp. 46–50 | 1965 (June) |
| Narcus, H. | "Metallizing of Plastics" | Rheinhold Publishing Corp. | 1960 |
| Reynolds, J. | "Electrically Conductive Polymers" | Chemtech American Chemical Society, vol. 18, pp. 440–447. | 1988 |
| Roth et al. | "Conducting Polymers" | Advanced Materials, 2 no. 8, pp. 356–360. | 1990 |
| Skotheim, T. | "Electroresponsive Molecular and Polymeric Systems" (Vol. 1) | Marcel Dekker, Inc. vol. 2, pp. 187–256. | 1991 |
| Wessling et al. | "Models for Understanding Processing Properties of Intrinsically Conductive Polymers" | Mol. Cryts. Liq. Cryst. Gordon and Breach Science Publishers vol. 160, pp. 205–220 | 1988 |
| Wirsen, A. | "Electroactive Polymer Materials" | Technomic Publishing Company, Inc. | 1992 |

Those of ordinary skill in the art will understand that various blends, combinations, permutations, and mixtures of the materials disclosed in the foregoing publications fall within the scope of the invention. Moreover, those of ordinary skill in the art will find that the publications listed in Table 1 suggest many materials not disclosed explicitly therein, but which nonetheless fall within the scope of the invention.

Electrically conductive anisotropy is another aspect of some electrically conductive plastics finding application in the invention. As used herein, the term "electrically conductive anisotropy" means a material having a first electrical conductivity when measured along one axial direction, and a second electrical conductivity different from the first electrical conductivity when measured along another, generally orthogonal axial direction. For example, electrically conductive plastic sidewalls 69 in FIG. 2(b) may have a first electrical conductivity when measured in a direction parallel to longitudinal axis 150, and a second electrical conductivity when measured in a direction orthogonal or transverse to longitudinal axis 150. Depending on the composition and treatment of electrically conductive plastic sidewalls 69, the electrical conductivity thereof as measured along one direction may differ substantially from that measured in a different direction. Such electrically conductive anisotropy may be used to advantage in respect of the design and placement of switch 68 in FIG. 2(b) or switch 110 in FIG. 7. The directional control of electrical conductivity in a structural element of a light source is a unique aspect of the present invention.

Figure 10:
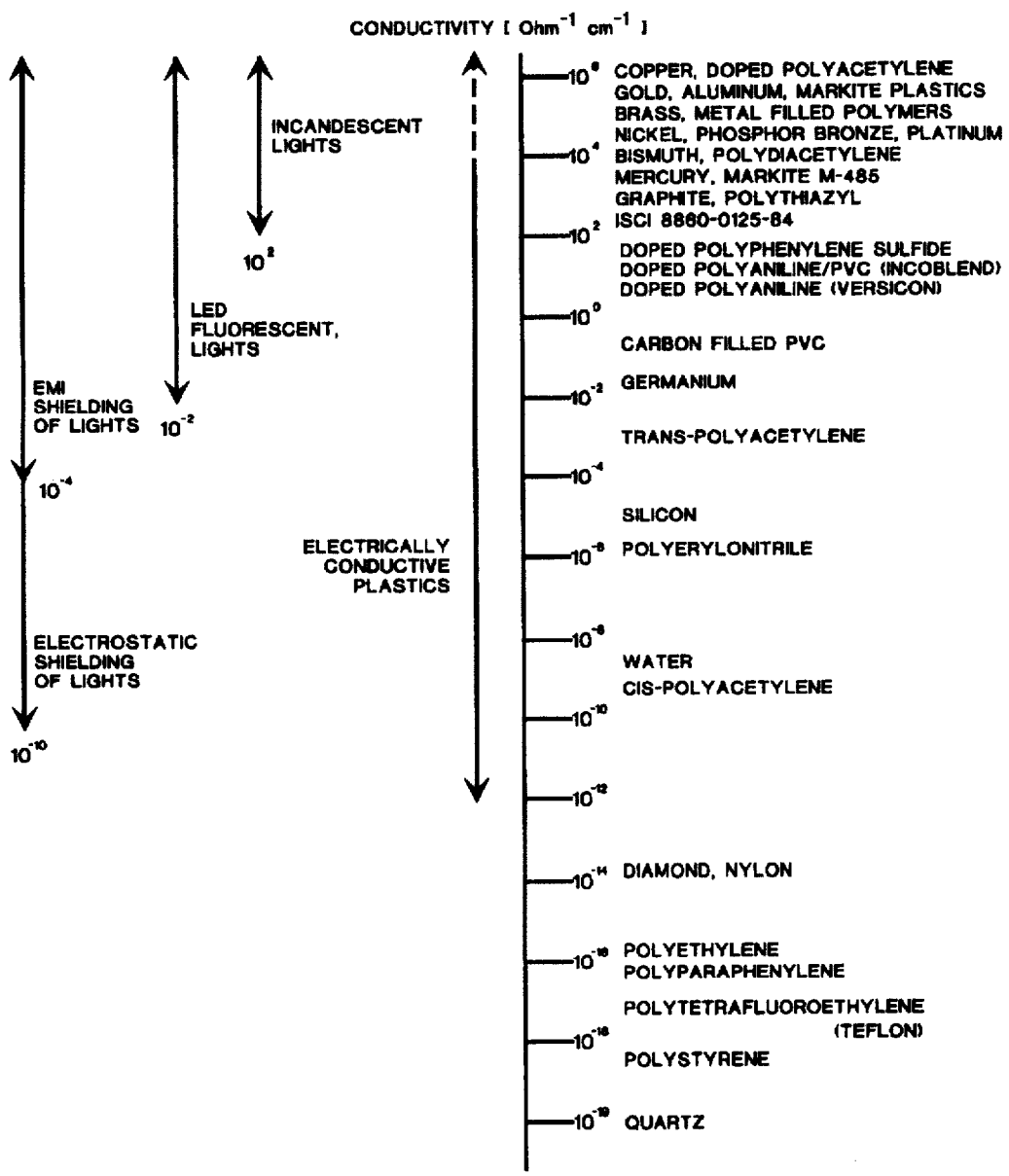
FIG. 10 shows the electrical conductivities of different materials and devices, including those finding application in the invention.

Relatively high electrical conductivities are required in the electrically conductive plastic electrical circuit elements of the invention when incandescent bulbs or fluorescent lamps are used; those devices require large amounts of current relative to LEDs. FIG. 10 shows the electrical conductivities of different materials and devices, and shows that the range of electrical conductivities associated with the electrically conductive plastics of the invention overlaps the ranges of electrical conductivities associated with incandescent bulbs, LEDs, and fluorescent lamps. FIG. 10 shows further that the electrical conductivities characteristic of some electrically conductive plastics of the invention rival those of metals like copper, which heretofore have been used almost exclusively as the conductors of choice in electrical circuits of prior art light sources and lanterns. Thus, the present invention is not limited to light sources having LEDs only, but includes within its scope light sources having incandescent bulbs and fluorescent lamps.

It is well known by those of ordinary skill in the art that incandescent bulbs in light sources can generate heat sufficient to distort or melt portions of the light source such as the reflector, which is typically formed of metallized plastic. Thus, the thermal conductivity of various portions of the light source, and especially the head assembly, is often an important design consideration. Light sources having metal battery housings and metal head assemblies generally have high thermal conductivities, and thus conduct heat efficiently away from the region surrounding the bulb. Light sources having plastic battery housings and head assemblies generally do not have high thermal conductivity, and thus are more prone to melting or becoming warped. As previously noted, however, plastic light sources have several important advantages respecting metal light sources. There exists a need, therefore, for a flashlight or lantern having a plastic battery housing or head assembly that also has higher thermal conductivity.

Figure 11:
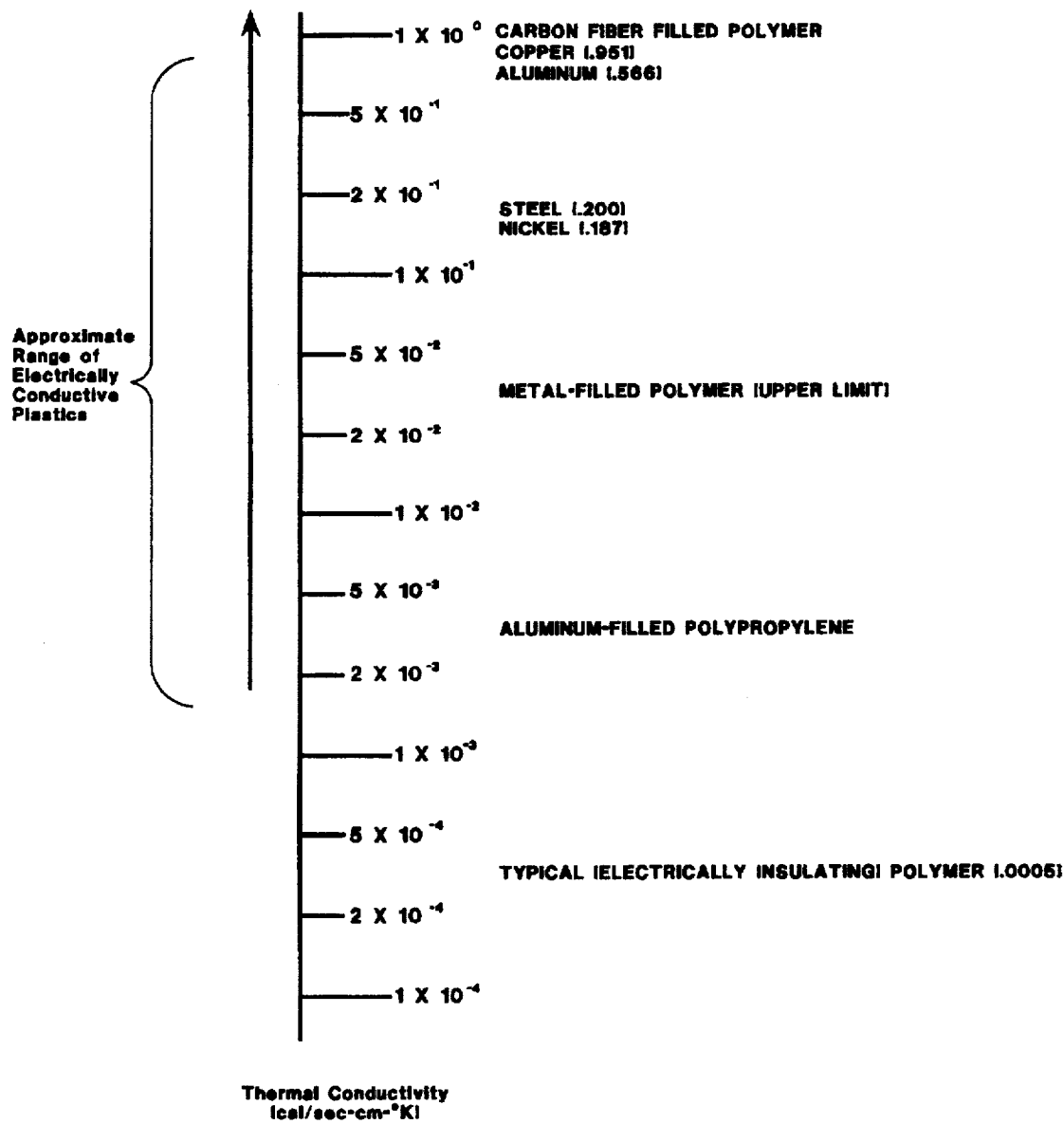
FIG. 11 shows the thermal conductivities of different materials, including those finding application in the invention.
Figure 12:
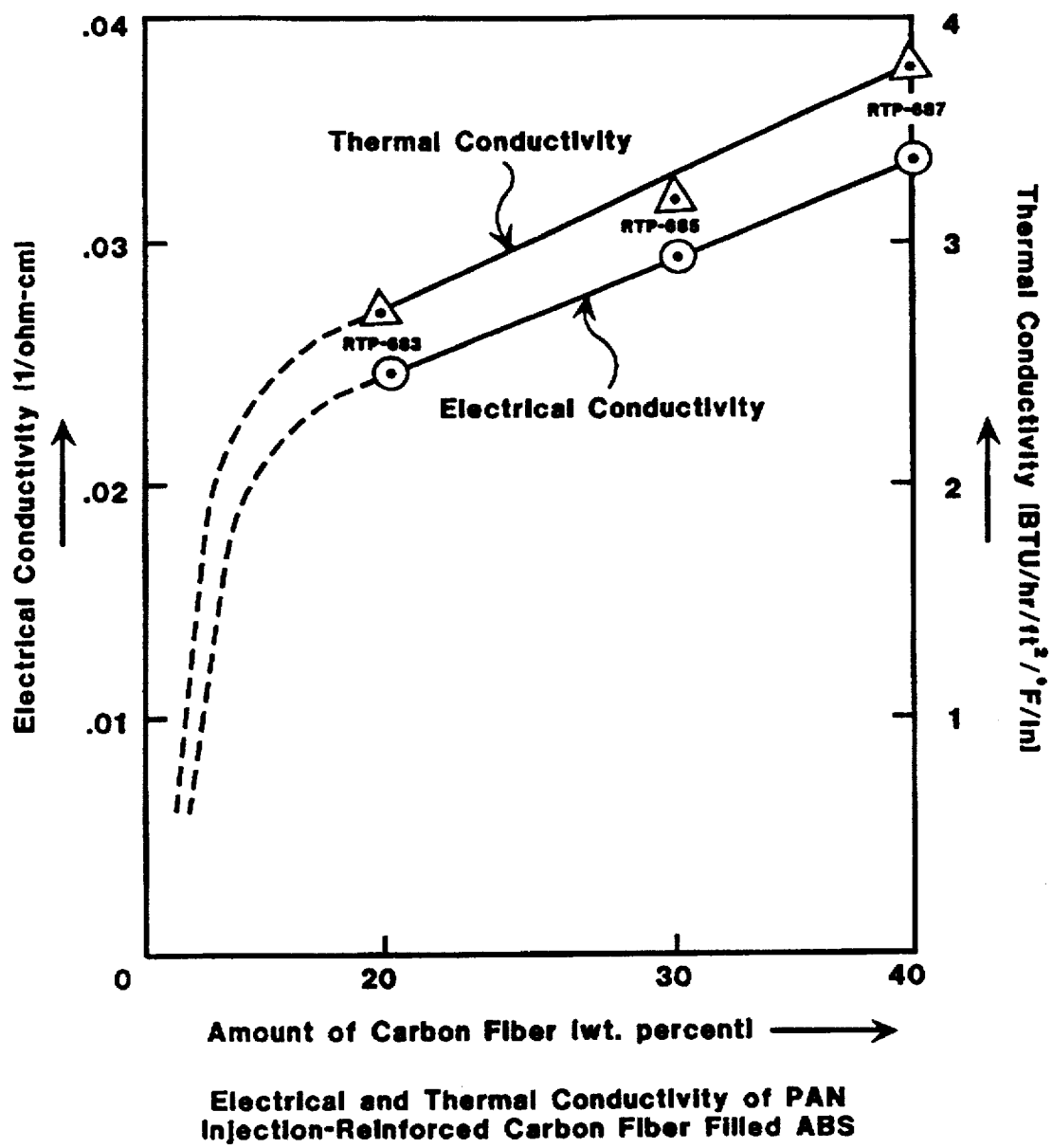
FIG. 12 shows the electrical and thermal conductivities of a particular material finding application in the invention.

The invention satisfies this need by providing a battery housing or head assembly that has improved thermal conductivity characteristics. It was discovered that increases in the electrical conductance of the plastics of the invention were paralleled by corresponding increases in thermal conductivity. FIG. 11 shows thermal conductivities associated with different materials, including those of the electrically conductive plastics of the invention. The electrically conductive plastics of the invention exhibit a range of thermal conductivities overlapping those of materials having very high thermal conductivities (such as copper and steel). Furthermore, the plastics of the invention exhibit thermal conductivities far exceeding those of conventional electrically insulative polymers. FIG. 12 shows that increases in the electrical conductivity of a PAN injection-reinforced carbon-fiber filled ABS plastic suitable for use in the invention are tracked by corresponding increases in the thermal conductivity.

A first method of making an intrinsically electrically conductive plastic component or assembly of a light source of the present invention comprises four basic steps: (a) selecting an appropriate raw electrically conductive plastic as a starting material; (b) melting the plastic to form molten plastic; (c) molding the molten plastic in a mold to form a light source component or assembly, and (d) ejecting the molded component from the mold. The first method may comprise the additional step of assembling the light source from various members, including the molded component or assembly.

The terms "ejecting" and "removing" are used interchangeably in the specification and claims hereof, and refer to any process that causes a molded component or assembly of the invention to be removed from a mold, cavity, die, or the like, upon completion of the molding step. Furthermore, the terms "mold," "cavity," and "die" are used interchangeably in the specification and claims hereof, and refer to any form or matrix for shaping a plastic substance.

A second method of making an extrinsically conductive plastic component or assembly of a light source of the invention comprises five basic steps: (a) selecting an appropriate raw electrically non-conductive resin, matrix or base material as a starting material; (b) melting the plastic to form molten plastic; (c) adding electrically conductive materials such as electrically conductive fillers, electrically conductive fiber additives, cryptocryst formations, ionically conducting polychelates, ionically conducting ionomers, and ionically conducting quaternary compounds, such material most preferably being added to the melted plastic, but alternatively being added to the unmelted starting material; (d) molding the molten plastic in a mold to form a light source component or assembly; (e) ejecting the molded component from the mold. The second method may comprise the additional step of assembling the light source from various members, including the molded component or assembly.

In either the first or the second method, colorants may be added to the molten plastic prior to the molding step.

A preferred method of making an electrically conductive barrel for a flashlight of the present invention comprises the following steps: (a) selecting an electrically conductive plastic as a starting material; (b) melting the plastic to form a molten plastic; (c) performing a mold flow check on a sample of the molten plastic to determine whether the viscosity of the molten plastic is appropriate for a subsequent blow-molding step; (d) mixing colorant into the molten plastic to form colored molten plastic; (e) forming a tube-shaped parison of semi-molten plastic from the colored molten plastic; (f) forcing the parison into a mold cavity for a flashlight barrel; (g) shaping the parison by internal air pressure means so that it conforms to the shape of the cavity, the parison assuming the shape of an untrimmed flashlight barrel; (h) ejecting the untrimmed barrel from the cavity; (i) trimming excess plastic from the barrel to form a trimmed, finished barrel.

Injection molding methods may also be used to make electrically conductive light source components of the invention by injecting a predetermined quantity of molten electrically conductive plastic into a die.

Regardless of the molding method employed, any of the various structural or electrically conductive circuit elements, assemblies, or components of a light source may be formed using electrically conductive plastic as a starting or intermediary molten material. Assemblies and components formed by such processes falling within the scope of the present invention include tailcap assemblies and components, battery housing assemblies and components, head assemblies and components, switch assemblies and components, and battery housing extension assemblies and components.

The particular embodiment of the invention set forth herein relates to a light source and method of making same. Those of ordinary skill in the art will recognize, however, that the present invention is not limited in scope or spirit to applications for hand-held portable flashlights or lanterns only. The present invention includes within its scope other portable and semi-portable light sources and other methods of making the invention. For example, the invention may be used in devices such as semi-portable spotlights, warning beacons and lights, and the like. Furthermore, the invention may be manufactured using plastic extrusion or casting processes suitable for electrically conductive plastics.

Those of ordinary skill in the art will therefore understand that various modifications and variations may be resorted to without departing from the spirit and scope of the present invention, and that such modifications and variations, together with other equivalent embodiments, are within the purview and scope of the appended claims.

We claim:

1. A light source, comprising:
   (a) a battery housing assembly for containing at least one dry cell, the housing assembly having a first end and a second end;
   (b) a head assembly connected to the first end of the housing assembly and comprising a light emitter;
   (c) an electrical circuit for providing electrical current from the at least one dry cell to the light emitter, and
   (d) a switch assembly attached to the light source for selectively providing electrical current from the at least one dry cell to the light emitter,
   wherein at least one of the battery housing assembly, the head assembly, and the switch assembly comprises electrically conductive plastic which forms an electrically conductive element of the electrical circuit and which imparts structural integrity or shape to the light source.

2. The light source of claim 1, further comprising a tailcap connected to the second end of the battery housing assembly.

3. The light source of claim 2, wherein the tailcap comprises electrically conductive plastic and is an electrically conductive element of the electrical circuit of the light source.

4. The light source of claim 1, wherein the electrically conductive plastic is extrinsically conductive.

5. A light source, comprising:
   (a) a battery housing assembly for containing at least one dry cell, the housing assembly having a first end and a second end;
   (b) a head assembly connected to the first end of the housing assembly and comprising a light emitter;
   (c) an electrical circuit for providing electrical current from the at least one dry cell to the light emitter; and
   (d) a switch assembly attached to the light source for selectively providing electrical current from the at least one dry cell to the light emitter,
   wherein at least one of the battery housing assembly, the head assembly, and the switch assembly comprises electrically conductive plastic and forms an electrically conductive element of the electrical circuit and wherein the electrically conductive plastic is extrinsically conductive and comprises a constituent selected from the group consisting of electrically conductive fillers, electrically conductive fiber additives, cryptocryst formation materials, ionically conducting polychelates, ionically conducting ionomers, and ionically conducting quaternary compounds.

6. The light source of claim 5, wherein the electrically conductive plastic comprises a constituent selected from the group consisting of carbon black, graphite, metal coated flakes, nickel coated flakes, 8 micron diameter 304 stainless steel fibers, metal coated fibers, nickel coated fibers, cryptocryst formation materials, and ionically conducting polychelate materials having complexes with metal salts.

7. The light source of claim 1, wherein the electrically conductive plastic is intrinsically conductive.

8. A light source, comprising:
(a) a battery housing assembly for containing at least one dry cell, the housing assembly having a first end and a second end;
(b) a head assembly connected to the fist end of the housing assembly and comprising a light emitter;
(c) an electrical circuit for providing electrical current from the at least one dry cell to the light emitter, and
(d) a switch assembly attached to the light source for selectively providing electrical current from the at least one dry cell to the light emitter,
wherein at least one of the battery housing assembly, the head assembly, and the switch assembly comprises electrically conductive plastic and forms an electrically conductive element of the electrical circuit and wherein the electrically conductive plastic is intrinsically conductive and comprises a constituent selected from the group consisting of charge transfer complex materials, ionic materials, conjugated materials, blended materials, doped polymers, and undoped polymers.

9. The light source of claim 8, wherein the electrically conductive plastic comprises a constituent selected from the group consisting of Poly (4-hydroxystyrene) with (4-(hexyloxy)phenyl) (4-nitrophyenyl)), and polyacetylene.

10. The light source of claim 1, wherein the electrically conductive plastic comprises a mixture of extrinsically conductive plastic and intrinsically conductive plastic.

11. A light source, comprising:
(a) a battery housing assembly for containing at least one dry cell, the housing assembly having a first end and a second end;
(b) a head assembly connected to the first end of the housing assembly and comprising a light emitter;
(c) an electrical circuit for providing electrical current from the at least one dry cell to the light emitter, and
(d) a switch assembly attached to the light source for selectively providing electrical current from the at least one dry cell to the light emitter,
wherein at least one of the battery housing assembly, the head assembly, and the switch assembly comprises electrically conductive plastic and forms an electrically conductive element of the electrical circuit and wherein the electrically conductive plastic comprises a constituent selected from the group consisting of hydrocarbon-based electrically conductive polymers, transpolyacetylene, carbon-filled PVC, markite plastics, tetracyanoquinodimethane (TCNQ) (CT salt), tetrathiafulvane (TTF) (CT salt), tetramethyltetraselafulvalene (TMTSF) (CT salt), Bis (ethylenedithiolo) tetrathiafulvalense (BEDT-TTF) (CT salt), Polythiazyl (inherent/doped), polythiophene (inherent/doped), polyacetylene (doped), polyaniline (doped), poly-p-phenylene (inherent/doped), poly-p-phenylene vinylene (doped), poly-p-phenylene sulfide (doped), poly (benzene) (doped), poly (anthracene) (doped), poly (napthalene) (doped), polytrimethylsilylacetylene (PTMSA) (inherent/doped), poly (1,6 heptadiene) (inherent), polyethylene succinate (doped), polyethylene oxide (doped), polypropylene oxide (doped), polyvinyl acetate (doped), polyphtalonitrile (inherent/doped), poly-n-propylaziridine (doped), polythiazyl (inherent), phthalocyanine/kevlar (doped), phthalonitride, naphthalocyanine/fluoroaluminum (doped), naphthalocyanine/fluorogallium (doped), poly (phenylenevinylene) (doped), polycarbozole, polyphosphazines (inherent/doped), carboranylmethyl-substituted phosphazines (inherent/doped), polyalkyl carbozoyl (doped), polyquinoline, polyacene quinone (inherent), polybismethylene hydroquinone (doped), polypyridyl methylquinoline (inherent/doped), poly-n-propylaziridine (doped), polypyrroles (doped/ion implant), polyphosphazines (inherent), and polydimethyl phenylene oxide (doped/ion implant).

12. The light source of claim 1, wherein the light source is one of a flashlight, a lantern, a spotlight, a warning light, and a beacon.

13. The light source of claim 2, wherein the light source is a flashlight.

14. The light source of claim 3, wherein the light source is a flashlight.

15. The light source of claim 1, wherein the light emitter is a light emitting diode.

16. The light source of claim 1, wherein the light emitter is an incandescent bulb.

17. The light source of claim 1, wherein the light emitter is a fluorescent lamp.

18. The light source of claim 1, wherein the battery housing assembly receives at least one of a dry cell selected from the group consisting of AAA-size dry cells, AA-size dry cells, C-size dry cells, and D-size dry cells.

19. A light source, comprising:
(a) a battery housing assembly for containing at least one dry cell, the housing assembly having a first end and a second end;
(b) a head assembly connected to the first end of the housing assembly and comprising a light emitter;
(c) an electrical circuit for providing electrical current from the at least one dry cell to the light emitter;
(d) an electrically conductive plastic battery housing extension connected to the second end of the battery housing assembly, the battery housing extension forming an electrically conductive element of the electrical circuit of the light source;
(e) an electrically conductive plastic tailcap assembly connected to the battery housing extension such that the battery housing extension is disposed between the second end of the battery housing and the tailcap assembly, and wherein the tailcap assembly is an electrically conductive element of the electrical circuit of the light source; and
(f) a switch assembly attached to the light source for selectively providing electrical current from the at least one dry cell to the light emitter;
wherein at least one of the battery housing assembly, the head assembly, and the switch assembly comprises electrically conductive plastic and forms an electrically conductive element of the electrical circuit.

20. The light source of claim 1, wherein an electrically conductive plastic battery housing extension is disposed between, and connected to, the first end of the battery housing assembly and the head assembly, the battery housing extension forming an electrically conductive element of the electrical circuit of the light source.

21. A battery housing assembly for a battery-powered light source having an electrical circuit for energizing and de-energizing a light emitter, the battery housing assembly comprising an electrically conductive plastic sidewall which is suitable for forming an electrically conductive element of the circuit and which imparts structural integrity and shape to the battery housing which is suitable for housing one or more batteries.

22. A battery housing extension for a battery-powered light source having an electrical circuit for energizing and de-energizing a light emitter, the battery housing extension comprising an electrically conductive plastic sidewall which is suitable for forming an electrically conductive element of the circuit and which imparts structural integrity and shape to the battery housing extension which is suitable for housing one or more batteries.

23. A tailcap for a battery-powered light source having an electrical circuit for energizing and de-energizing a light emitter, the tailcap comprising electrically conductive plastic which is suitable for forming an electrically conductive element of the circuit and which imparts structural integrity and shape to the tailcap.

24. A head assembly for a batter-powered light source having an electrical circuit for energizing and de-energizing a light emitter, the head assembly comprising electrically conductive plastic which is suitable for forming an electrically conductive element of the circuit and which imparts structural integrity and shape to the light source.

25. A moveable switch for a battery-powered light source having an electrical circuit for energizing and de-energizing a light emitter, the switch being capable of being moved into a first position for energizing the light emitter and a second position for de-energizing the light emitter and comprising electrically conductive plastic which is suitable for forming an electrically conductive element of the circuit and which imparts structural integrity and shape to the moveable switch.

26. A light source, comprising:
  (a) a power source housing assembly for containing at least one electrical power source;
  (b) a light emitter assembly comprising at least one light emitter, the light emitter assembly and power source housing assembly defining an electrically conductive pathway that permits electrical current from said at least one electrical power source to flow through said assemblies and said light emitter, said light emitter being energized by said electrical current and providing light in response thereto, and
  (c) a switch assembly disposed on one of said assemblies, the switch assembly selectively providing electrical current from the at least one electrical power source to the light emitter;
  wherein at least a portion of said conductive pathway comprises electrically conductive plastic which imparts structural integrity and shape to at least one of the power source housing assembly and light emitter assembly.

27. The light source of claim 26, wherein the electrically conductive plastic is extrinsically conductive.

28. The light source of claim 26, wherein the electrically conductive plastic is intrinsically conductive.

29. The light source of claim 26, wherein the electrically conductive plastic comprises a mixture of extrinsically conductive plastic and intrinsically conductive plastic.

30. The light source of claim 26, wherein the light source is one of a flashlight, a lantern, a spotlight, a warning light, and a beacon.

31. The light source of claim 26, wherein the at least one electrical power source is at least one dry cell.

32. The light source of claim 26, wherein the at least one electrical power source is at least one wet cell.

33. The light source of claim 26, wherein the at least one electrical power source is a DC-to-DC step-down converter.

34. The light source of claim 26, wherein the at least one electrical power source comprises a circuit which rectifies input AC signals to produce an output DC voltage.

35. The light source of claim 26, wherein the light emitter is a light emitting diode.

36. The light source of claim 26, wherein the light emitter is an incandescent bulb.

37. The light source of claim 26, wherein the light emitter is a fluorescent lamp.

38. The light source of claim 26, wherein the battery housing assembly receives at least one of a dry cell selected from the group consisting of AAA-size dry cells, AA-size dry cells, C-size dry cells, and D-size dry cells.

* * * * *